US012540933B2

United States Patent
Molyneux et al.

(10) Patent No.: US 12,540,933 B2
(45) Date of Patent: *Feb. 3, 2026

(54) SYSTEM AND METHOD FOR CHARACTERIZING, MONITORING, AND DETECTING BIOAEROSOL PRESENCE AND MOVEMENT IN AN INDOOR ENVIRONMENT

(71) Applicant: Poppy Health, Inc., Mountain View, CA (US)

(72) Inventors: Sam D. Molyneux, Mountain View, CA (US); Elizabeth Caley, Mountain View, CA (US); Daniela Bezdan, Mountain View, CA (US); Nathan Volman, Mountain View, CA (US); Laila Ladhani, Mountain View, CA (US); Kalyan Kottapalli, Mountain View, CA (US); Konrad Swic, Mountain View, CA (US); Aaron Botham, Mountain View, CA (US)

(73) Assignee: Poppy Health, Inc., Mountain View, CA (US)

( * ) Notice: Subject to any disclaimer, the term of this patent is extended or adjusted under 35 U.S.C. 154(b) by 550 days.

This patent is subject to a terminal disclaimer.

(21) Appl. No.: 18/077,185

(22) Filed: Dec. 7, 2022

(65) Prior Publication Data
US 2023/0176024 A1 Jun. 8, 2023

Related U.S. Application Data

(60) Provisional application No. 63/405,340, filed on Sep. 9, 2022, provisional application No. 63/355,949, filed
(Continued)

(51) Int. Cl.
*G01N 33/00* (2006.01)
*G01N 15/06* (2006.01)
(Continued)

(52) U.S. Cl.
CPC ......... *G01N 33/0075* (2013.01); *G01N 15/06* (2013.01); *G01N 33/0006* (2013.01);
(Continued)

(58) Field of Classification Search
CPC ............... G01N 15/06; G01N 33/0006; G01N 33/0075; G01N 35/00722; G01N 2001/2223
See application file for complete search history.

(56) References Cited

U.S. PATENT DOCUMENTS

| 917,178 A | 4/1909 | Spitz et al. |
| 4,367,950 A | 1/1983 | Klug |

(Continued)

FOREIGN PATENT DOCUMENTS

| CN | 111662816 A | 9/2020 |
| CN | 112014528 A | 12/2020 |

(Continued)

OTHER PUBLICATIONS

"Aerosol tracer testing in Boeing 767 and 777 aircraft to simulate exposure potential of infectious aerosol such as SARS-CoV-2," Kinahan et al. PLOS One | https://doi.org/10.1371/journal.pone.0246916 Dec. 1, 2021.*
(Continued)

*Primary Examiner* — Nathaniel J Kolb
(74) *Attorney, Agent, or Firm* — Run8 Patent Group, LLC; Peter Miller; Leah Raddatz

(57) ABSTRACT

One variation of a method includes, during a test period: triggering release of a tracer test load into air in an environment, according to a set of release parameters, by a dispenser arranged within the environment, the first tracer test load comprising a first concentration of tracers of a first type in solution; and triggering an air sampler, located in the environment, to record a timeseries of aerosol data repre-
(Continued)

senting amounts of aerosol particles detected at the air sampler during the test period. The method further includes: deriving a tracer signal, representing changes in amounts of tracers in air detected at the air sampler during the test period, based on the timeseries of aerosol data and the set of release parameters; based on characteristics of the tracer signal, characterizing a set of aerosol flow metrics representing behavior of aerosols in the environment during the test period.

16 Claims, 7 Drawing Sheets

Related U.S. Application Data on Jun. 27, 2022, provisional application No. 63/329,717, filed on Apr. 11, 2022, provisional application No. 63/286,821, filed on Dec. 7, 2021, provisional application No. 63/286,815, filed on Dec. 7, 2021, provisional application No. 63/286,806, filed on Dec. 7, 2021.

(51) Int. Cl.
  *G01N 35/00* (2006.01)
  *G01N 1/22* (2006.01)

(52) U.S. Cl.
  CPC ... *G01N 35/00722* (2013.01); *A61L 2209/111* (2013.01); *G01N 2001/2223* (2013.01)

(56) References Cited

U.S. PATENT DOCUMENTS

| | | |
|---|---|---|
| 5,150,036 A | 9/1992 | Pourprix |
| 5,421,214 A | 6/1995 | Burgdorfer |
| 6,363,769 B2 | 4/2002 | Krajewski et al. |
| 6,686,999 B2 | 2/2004 | Ketkar |
| 6,974,669 B2 | 12/2005 | Mirkin et al. |
| 7,029,921 B2 | 4/2006 | Lee et al. |
| 7,389,158 B2 | 6/2008 | Desrochers et al. |
| 7,578,973 B2 | 8/2009 | Call et al. |
| 7,633,606 B2 | 12/2009 | Northrup et al. |
| 7,973,929 B2 | 7/2011 | Bates |
| 8,173,431 B1 | 5/2012 | Call |
| 8,272,280 B2 | 9/2012 | Jones, Jr. |
| 8,539,840 B2 | 9/2013 | Ariessohn et al. |
| 8,578,796 B2 | 11/2013 | Cho |
| 8,642,954 B2 | 2/2014 | Ivaldi et al. |
| 8,687,191 B2 | 4/2014 | Altobelli et al. |
| 8,689,648 B1 | 4/2014 | Heff |
| 9,063,040 B2 | 6/2015 | Calio et al. |
| 9,261,885 B2 | 2/2016 | Tryfonos et al. |
| 9,689,792 B1 | 6/2017 | Sickenberger et al. |
| 9,989,445 B2 | 6/2018 | Ligugnana et al. |
| 10,919,047 B2 | 2/2021 | Mainelis et al. |
| 10,928,389 B2 | 2/2021 | Fan et al. |
| 11,300,484 B1 | 4/2022 | Bango |
| 11,365,409 B2 | 6/2022 | Shum et al. |
| 11,366,116 B1 | 6/2022 | Meagher et al. |
| 12,181,401 B2* | 12/2024 | Kottapalli .............. G01N 15/06 |
| 2002/0012611 A1 | 1/2002 | Stylli et al. |
| 2005/0032241 A1 | 2/2005 | Coassin et al. |
| 2005/0255600 A1 | 11/2005 | Padmanabhan et al. |
| 2006/0040286 A1 | 2/2006 | Mirkin et al. |
| 2007/0116607 A1 | 5/2007 | Wang et al. |
| 2008/0014576 A1 | 1/2008 | Jovanovich et al. |
| 2008/0281528 A1 | 11/2008 | Relle, Jr. |
| 2011/0251084 A1 | 10/2011 | Brenan et al. |
| 2011/0252897 A1 | 10/2011 | Swenson et al. |
| 2012/0174650 A1 | 7/2012 | Ariessohn et al. |
| 2013/0045496 A1 | 2/2013 | Jansen |
| 2013/0234053 A1 | 9/2013 | Thomas et al. |
| 2016/0362730 A1 | 12/2016 | Alexander et al. |
| 2017/0284934 A1 | 10/2017 | Wang et al. |
| 2018/0155771 A1 | 6/2018 | Takahashi et al. |
| 2018/0305772 A1 | 10/2018 | Gilbert et al. |
| 2019/0025299 A1 | 1/2019 | Vigneault et al. |
| 2019/0039076 A1 | 2/2019 | Mainelis et al. |
| 2019/0257737 A1 | 8/2019 | Clayton et al. |
| 2020/0179932 A1 | 6/2020 | Williams et al. |
| 2021/0208062 A1 | 7/2021 | Linden |
| 2021/0324485 A1* | 10/2021 | Hodges .................. C12Q 1/686 |
| 2022/0034763 A1 | 2/2022 | Dutta |
| 2022/0091010 A1 | 3/2022 | Wystup et al. |
| 2022/0341823 A1* | 10/2022 | Molyneux .......... G01N 33/0006 |
| 2022/0341850 A1* | 10/2022 | Molyneux .............. G01N 15/06 |
| 2022/0341955 A1* | 10/2022 | Molyneux ............. G01N 33/497 |
| 2023/0091339 A1* | 3/2023 | Molyneux ............ G01N 1/2202 73/28.01 |
| 2023/0176024 A1* | 6/2023 | Molyneux ........ G01N 35/00722 222/52 |
| 2023/0393161 A1* | 12/2023 | Molyneux .............. G01N 15/06 |
| 2023/0417646 A1* | 12/2023 | Kottapalli ................ F24F 11/30 |
| 2025/0076174 A1* | 3/2025 | Kottapalli ................ F24F 11/30 |

FOREIGN PATENT DOCUMENTS

| | | |
|---|---|---|
| DE | 102012101063 A1 | 8/2013 |
| JP | 2017096727 A | 6/2017 |
| KR | 20110097199 A | 8/2011 |
| WO | 2006060872 A1 | 6/2006 |
| WO | 2005029003 A3 | 5/2007 |
| WO | 2019018559 A1 | 1/2019 |
| WO | 2019046347 A9 | 7/2019 |
| WO | 2022047340 A1 | 3/2022 |
| WO | 2022081543 A1 | 4/2022 |

OTHER PUBLICATIONS

International Search Report and Written Opinion for International Patent Application No. PCT/US2021/64875 mailed on Mar. 29, 2022; 13 pages.
International Search Report and Written Opinion for International Patent Application PCT/US2022/026201 mailed on Oct. 5, 2022; 14 pages.
M. Z. Bazant, J. W. Bush, A guideline to limit indoor airborne transmission of covid-19. Proceedings of the National Academy of Sciences. 118 (2021), doi:10.1073/pnas.2018995118.
Non-Final Office Action for U.S. Appl. No. 17/728,809 dated Dec. 21, 2022.
Non-Final Office Action for U.S. Appl. No. 17/982,004 dated Mar. 16, 2023.
Non-Final Office Action for United States U.S. Appl. No. 17/559,257 mailed on Jun. 8, 2022; 7 pages.
Notice of Allowance and Fees Due for U.S. Appl. No. 17/559,257 dated Sep. 20, 2022.
Notice of Allowance and Fees Due for U.S. Appl. No. 17/728,823 dated Sep. 2, 2022.
Notice of Allowance and Fees Due for U.S. Appl. No. 18/071,392 dated Apr. 3, 2023.
W. John Kress et al. "DNA barcodes, Genes, genomics, and bioinformatics", The Proceedings of the National Academy of Sciences, vol. 105, 8, Feb. 26, 2008.

* cited by examiner

SYSTEM AND METHOD FOR CHARACTERIZING, MONITORING, AND DETECTING BIOAEROSOL PRESENCE AND MOVEMENT IN AN INDOOR ENVIRONMENT

CROSS-REFERENCE TO RELATED APPLICATIONS

This application claims the benefit of U.S. Provisional Application No. 63/405,340, filed on 9 Sep. 2022, U.S. Provisional Application No. 63/355,949, filed on 27 Jun. 2022, U.S. Provisional Application No. 63/329,717, filed on 11 Apr. 2022, U.S. Provisional Application No. 63/286,821, filed on 7 Dec. 2021, U.S. Provisional Application No. 63/286,806, filed on 7 Dec. 2021, and U.S. Provisional Application No. 63/286,815, filed on 7 Dec. 2021, each of which is incorporated in its entirety by this reference.

This application is related to U.S. patent application Ser. No. 17/728,823, filed on 25 Apr. 2022, which is incorporated in its entirety by this reference.

TECHNICAL FIELD

This invention relates generally to the field of metagenomics and more specifically to a new and useful system and method for aerosol detection in the field of metagenomics.

BRIEF DESCRIPTION OF THE FIGURES

FIG. 3 is a flowchart representation of one variation of the method;

FIGS. 5A and 5B are schematic representations of a system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
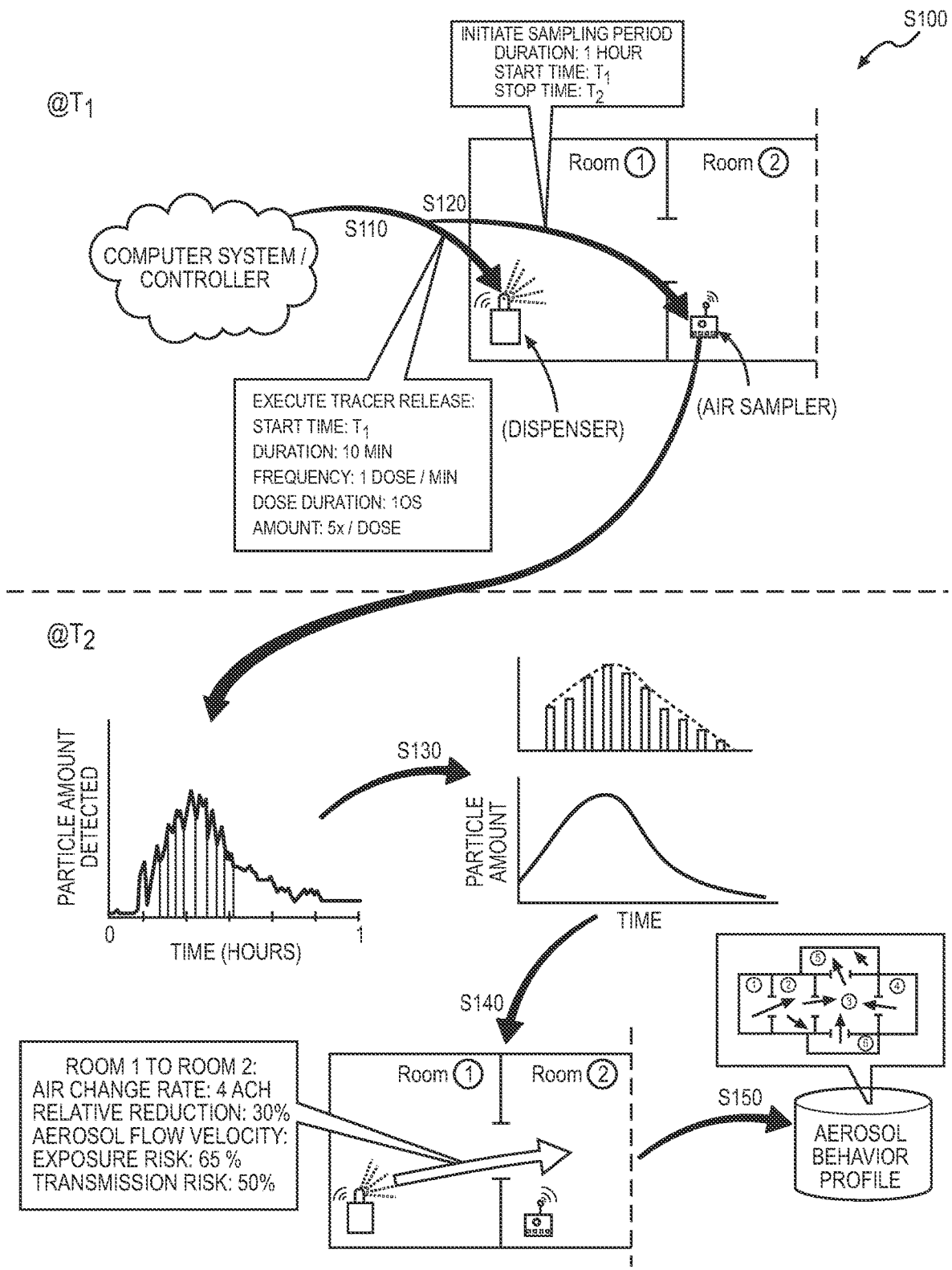
FIG. 1 is a flowchart representation of a method.
Figure 2:
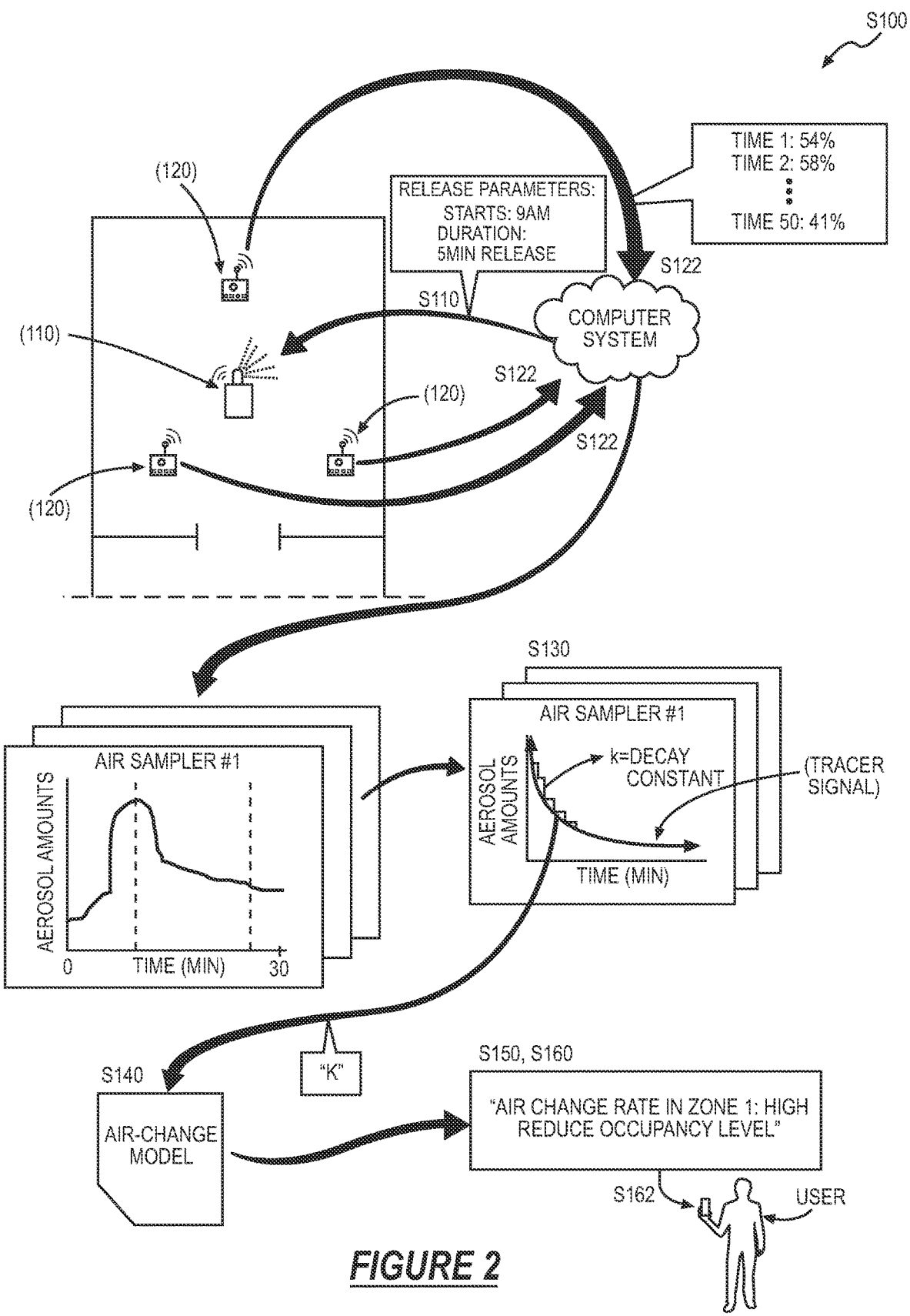
FIG. 2 is a flowchart representation of one variation of the method.
Figure 3:
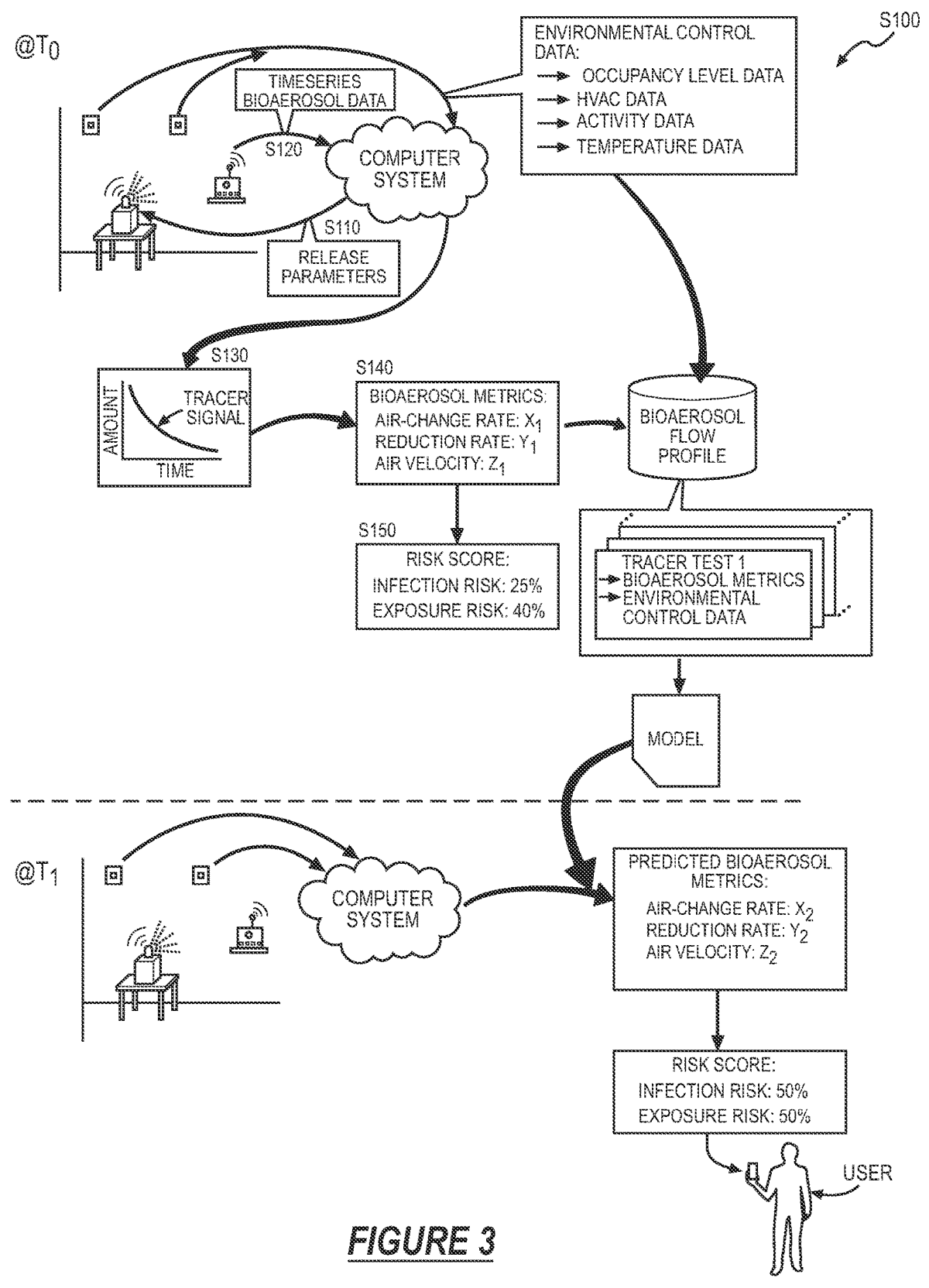
Figure 4:
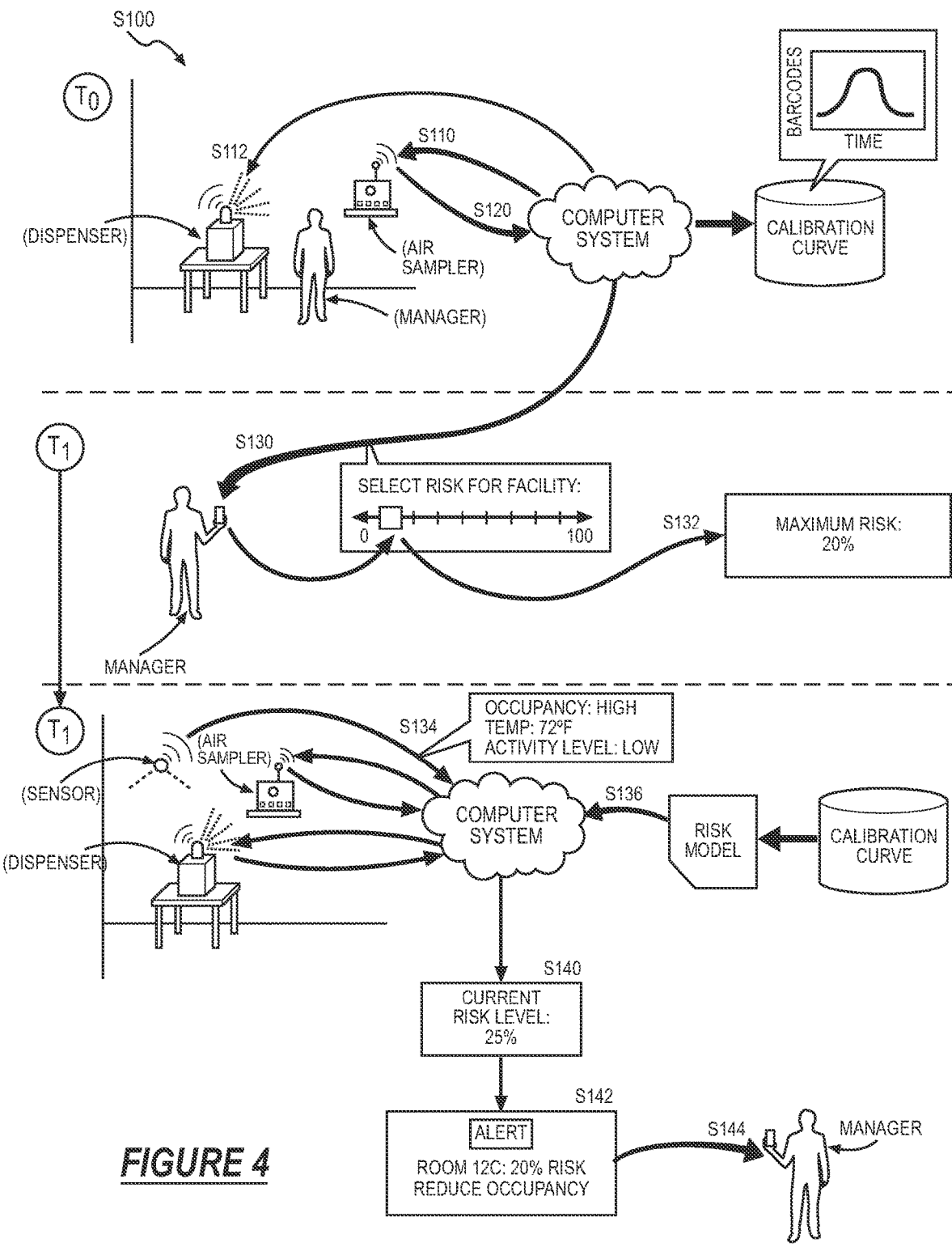
FIG. 4 is a flowchart representation of one variation of the method.
Figures 5A, 5B:
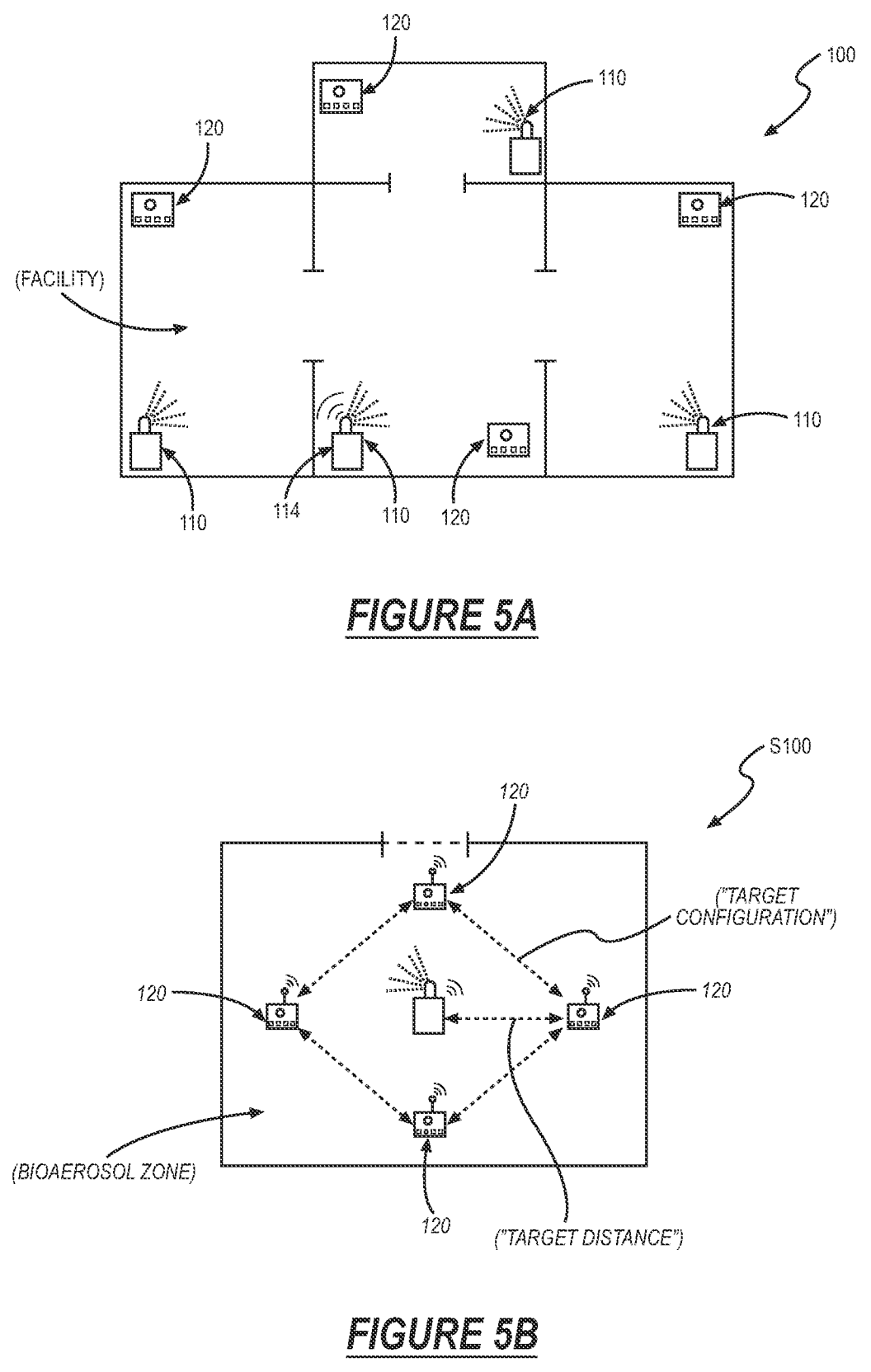
Figure 6:
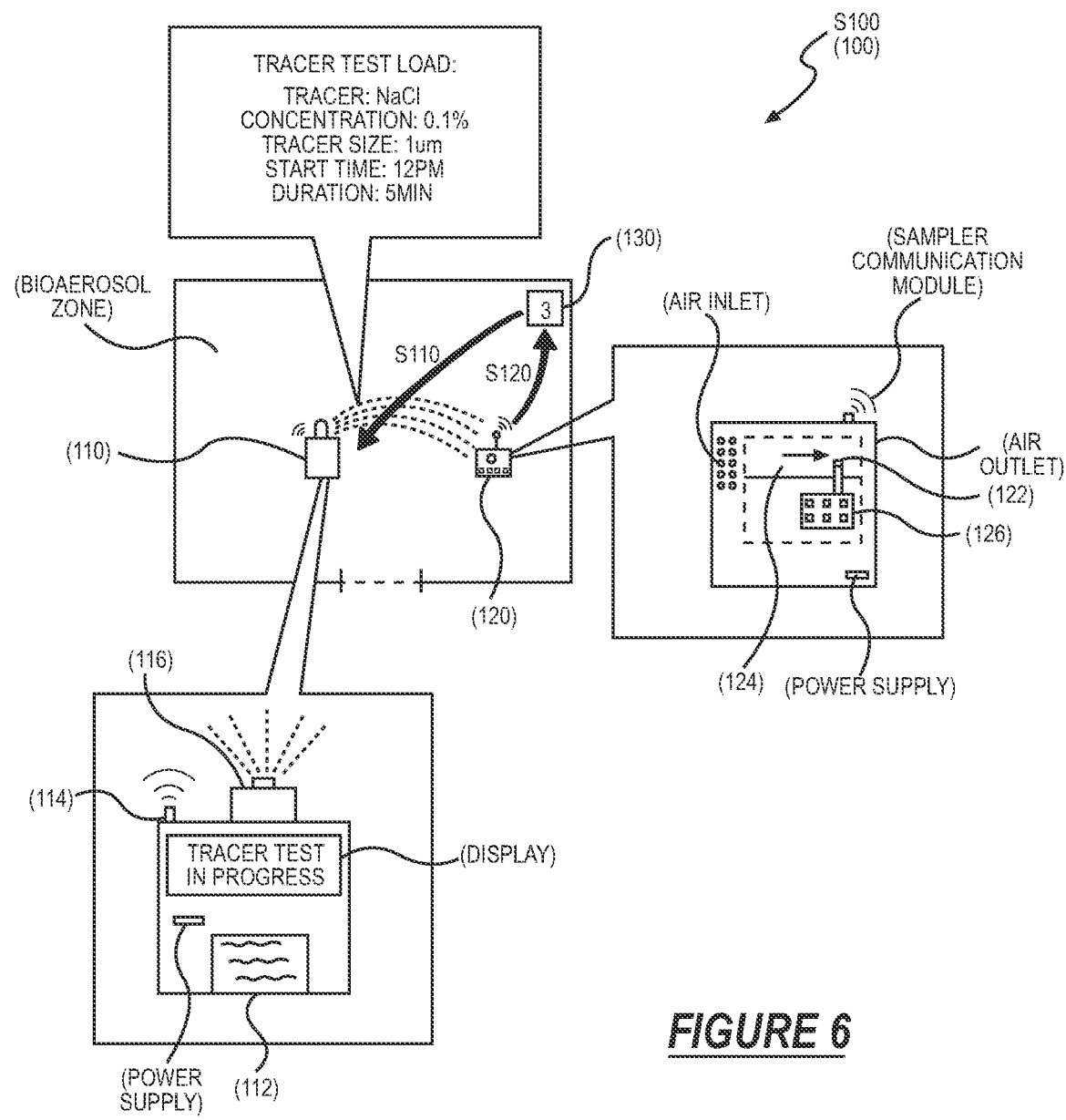
FIG. 6 is a flowchart representation of one variation of the method.
Figure 7:
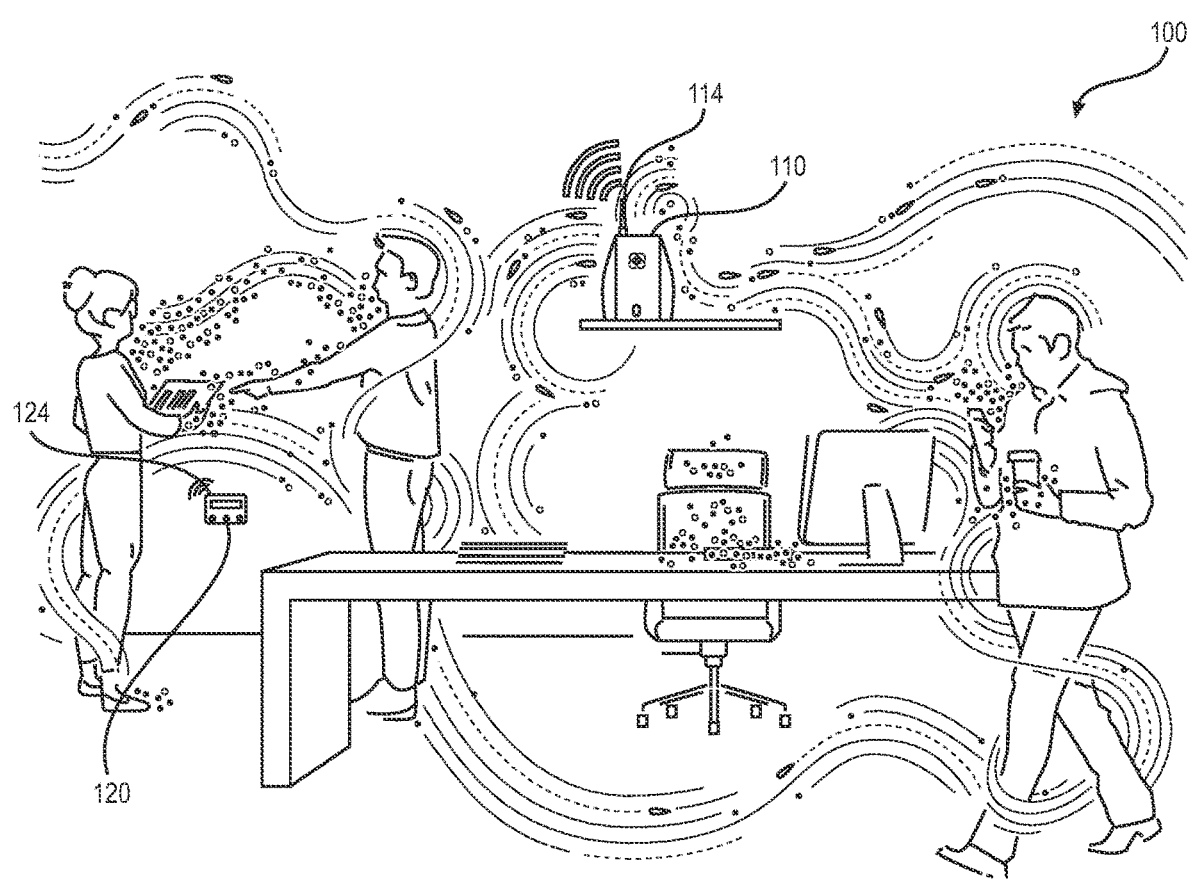
FIG. 7 is a schematic representation of the system.

As shown in FIGS. 1-7, a method S100 includes, during a first test period for an aerosol zone: during a dispense period, triggering release of a first tracer test load into ambient air in the aerosol zone, according to a first set of release parameters, by a dispenser arranged in a first location within the aerosol zone, the first tracer test load including a first concentration of tracers of a first type in solution in Block S110; and recording a first timeseries of aerosol data via a first set of sensors 122 integrated into a first air sampler, in a set of air samplers, arranged in a second location within the aerosol zone, the first timeseries of aerosol data representing amounts of aerosolized particles in ambient air ingested by the first air sampler during the first test period in Block S120. The method S100 further includes: deriving a first tracer signal representing changes in amounts of tracers of the first type in air detected at the first air sampler during the first test period based on the first timeseries of aerosol data and the first set of release parameters in Block S130; and, based on characteristics of the first tracer signal and the first concentration, predicting a first air-change rate for aerosolized particles of the first type in the aerosol zone during the first test period in Block S140.

One variation of the method S100 includes, during a first test period for an aerosol zone: during a dispense period, triggering release of a first tracer test load into ambient air in the aerosol zone, according to a first set of release parameters, by a dispenser arranged in a first location within the aerosol zone, the first tracer test load including a first concentration of tracers of a first type in solution in Block S110; and recording a first timeseries of aerosol data via a first set of sensors 122 integrated into a first air sampler, in a set of air samplers, arranged in a second location within the aerosol zone, the first timeseries of aerosol data representing amounts of aerosolized particles in ambient air ingested by the first air sampler during the first test period in Block S120. The method S100 further includes: deriving a first tracer signal representing changes in amounts of tracers of the first type in air detected at the first air sampler during the first test period based on the first timeseries of aerosol data and the first set of release parameters in Block S130; based on characteristics of the first tracer signal and the first concentration, predicting a first set of aerosol flow metrics for aerosolized particles of the first type in the aerosol zone during the first test period in Block S140; and, based on the first set of aerosol flow metrics, deriving a risk profile—representing risk associated with a set of pathogens of a first pathogen type corresponding to the first tracer type—for the first aerosol zone in Block S150.

One variation of the method S100 includes, during a test period: during a dispense period, triggering release of a first tracer test load into ambient air in an environment, according to a first set of release parameters, by a dispenser arranged within the environment, the first tracer test load comprising a first concentration of tracers of a first type in solution in Block S110; and triggering each air sampler, in a set of air samplers installed in the environment, to record a timeseries of aerosol data via a set of sensors 122 integrated into the air sampler in Block S120. In this variation, the method S100 further includes: for each air sampler, in the set of air samplers, deriving a tracer signal, in a set of tracer signals, representing changes in amounts of tracers in air detected at the air sampler during the test period based on the timeseries of aerosol data recorded at the air sampler and the first set of release parameters in Block S130; based on characteristics of the set of tracer signals, characterizing a set of aerosol flow metrics representing behavior of aerosols in the environment during the test period in Block S140; and characterizing infection risk associated with a set of pathogens in the environment based on the set of aerosol flow metrics in Block S150. In this variation, in response to infection risk associated with a first pathogen, in the set of pathogens, exceeding a threshold risk, the method S100 further includes: generating a notification indicating infection risk associated with the first pathogen in the environment in Block S160; and transmitting the notification to a user affiliated with the environment in Block S162.

As shown in FIGS. 1-7, one variation of the method S100 includes: at a first time, triggering a first dispenser, installed at a first location in an indoor environment, to execute a tracer release—including a series of dispensations of tracers (e.g., salt, fluorescent material, genetic material) into the indoor environment—according to a first set of release parameters and over a first dispense period, the first set of release parameters including a target duration of the dispense period, a target amount of tracers (e.g., salt, fluorescent material, genetic material) dispensed in each dispensation in the series of dispensations, a target frequency of dispensations in the series of dispensations, and a target dispense duration of each dispensation in the series of dispensations in Block S110; and, at approximately the first time, triggering an air sampler, installed at a second location in the indoor environment, to record a timeseries of aerosol data—representing timestamped amounts of aerosol particles (e.g., aerosolized tracers) detected at the air sampler— via a set of sensors 122 (e.g., a particle counter) configured to detect presence of aerosol particles in air in Block S120. The method S100 further includes extracting a tracer signal from the timeseries of aerosol data based on the set of release parameters, the tracer signal representing change in amount of tracers detected at the air sampler over time in Block S130; characterizing an aerosol flow path between the first location and the second location in the indoor environment based on the tracer signal in Block S140; and deriving an aerosol behavior profile representative of aerosol behavior in the indoor environment based on the aerosol flow path in Block S150.

As shown in FIGS. 1-7, one variation of the method S100 includes, during a calibration period for a facility: triggering collection of a sequence of aerosol samples by an air sampler located in a first aerosol zone, in a set of aerosol zones, within the facility at a target frequency; triggering dispensation of a sequence of tracer test loads containing tracers of a first tracer type, in a set of tracer types, by a dispenser located in the first aerosol zone during the first sampling window in Block S110; accessing a timeseries of aerosol data, for tracers of the first tracer type, derived from the sequence of aerosol samples in Block S120; and deriving a first calibration curve for tracers of the first tracer type in the first aerosol zone based on the timeseries of aerosol data, the first calibration curve representative of changes in detected tracer levels of tracers of the first tracer type during the calibration period in Block S130.

The method S100 further includes, during an initial period succeeding the calibration period: prompting a user to select a threshold risk level for pathogens of a first pathogen type, in a set of pathogen types, associated with tracers of the first tracer type, in the first aerosol zone; and, in response to the user selecting a first threshold risk level, assigning the first threshold risk level to pathogens of the first pathogen type in the first aerosol zone. The method S100 further includes, during a live period succeeding the initial period: accessing a set of environmental controls corresponding to the first aerosol zone during the live period; accessing a first risk model, in a set of risk models, linking environmental controls in the first aerosol zone to risk levels associated with pathogens of the first pathogen type in the aerosol zone based on the first calibration curve; and tracking a risk level associated with pathogens of the first pathogen type in the first aerosol zone based on the set of environmental controls and the first risk model.

The method S100 further includes, in response to the risk level exceeding the threshold risk level: generating an alert including the risk level associated with pathogens of the first pathogen type in the first aerosol zone in Block S160; and transmitting the alert to the user associated with the facility in Block S162.

2. Aerosol Detection System

As shown in FIGS. 5A, 5B, 6, and 7, an aerosol detection system 100 includes: a dispenser 110 arranged in a target location in an indoor environment; and a set of air samplers 120 arranged in a target configuration about the dispenser in the indoor environment.

The dispenser includes: a reservoir 112 containing tracers in solution; a dispenser communication module 114; and an actuator 116 configured to transiently release tracer test loads, including aerosolized tracers in solution, from the reservoir 112 and into the indoor environment based on a command received by the dispenser communication module 114. Each air sampler, in the set of air samplers, include: a housing defining an inlet and an outlet; a detection chamber 124, fluidly coupled to the inlet and the outlet, within the housing; a set of sensors 122 configured to detect aerosols in air flowing through the detection chamber 124; and a controller 126 configured to read a set of signals from the set of sensors 122 and record timeseries amounts of aerosols in air flowing through the detection chamber 124 based on the set of signals.

In one variation, the aerosol detection system 100 further includes a computer module 130 (e.g., a computer system) configured to: transmit commands to the dispenser communication module 114 to selectively trigger release of tracer test loads by the actuator 116 according to a dispense schedule defined for the dispenser; selectively trigger activation of the air sampler based on the dispense schedule; and convert timeseries amounts of aerosols recorded by the controller 126 to a set of aerosol flow metrics for the indoor environment.

In one variation, the aerosol detection system 100 includes a computer module 130 configured to: coordinate operation of the dispenser 110; and coordinate operation of the air sampler 120.

One variation of the aerosol detection system 100 includes: a dispenser; an air sampler; and a controller 126. The dispenser includes: a dispenser communication module 114 configured to receive commands from the controller 126; a dispenser cartridge containing tracers in solution; and a nebulizer configured to release tracer test loads—containing aerosolized tracers—from the dispenser and into an indoor environment. The air sampler includes: a set of sensors 122 configured to generate timeseries of aerosol data representing presence of particles in air present at the air sampler in the indoor environment; and a sampler communication module configured to receive commands from the controller 126. The controller 126 is configured to: selectively trigger the dispenser to release tracer test loads into the environment according to a dispense schedule; selectively trigger activation of the air sampler according to the dispense schedule; and interpret presence of tracers at the set of sensors 122 based on timeseries of aerosol data recorded by the set of sensors 122.

3. Applications

Generally, Blocks of the method S100 can be executed by a computer system (e.g., a local or remote computer system, a computer network, a local or remote server) in conjunction with an aerosol detection system 100—including a dispenser 110 and an air sampler 120—(hereinafter the "system") to: dispense known (or "calibrated") amounts of a tracer (e.g., salt particles, fluorescent material, genetic material)—at a known time, location, frequency, and/or duration—into a space (e.g., an indoor environment); detect presence and amount (or magnitude, signal strength) of tracers in air present in the space over time; link tracers detected at the air sampler to a particular tracer release—executed by a dispenser at a particular time and location—based on identification of a unique tracer signal linked to the known time, location, frequency, and duration of the tracer release; and characterize aerosol behavior in the space based on this unique tracer signal and/or timeseries aerosol data (e.g., timeseries amounts of tracers) collected at the air sampler.

In particular, the system can characterize aerosol behavior in the space by linking tracers detected at the air sampler (e.g., at a particular time, magnitude, and/or frequency) to tracers released into the space by the dispenser, at a known time, magnitude, and/or frequency, in order to derive a set of aerosol flow metrics—such as an air-change rate, an aerosol clearance rate, an exposure reduction rate, an air-exchange rate between adjacent spaces, a velocity and/or direction of airflow, etc.—representing movement or flow of tracers and therefore airborne particles more generally (e.g., airborne pathogens) throughout the space.

In one implementation, the aerosol detection system 100 is deployed in a particular facility—such as an office building, a home, a restaurant, a classroom, a shopping mall, a hospital, an airport terminal, etc.—and configured to: dispense known amounts of tracers (e.g., salt particles) into the facility via release of tracer test loads at the molecular tracer dispenser; and detect amounts of aerosol particles—including aerosolized tracers—in ambient air in the facility at the air sampler. In this implementation, the dispenser can be configured to execute a tracer release according to a particular set of release parameters—such as including a particular dispense time (e.g., a timestamp, a time period), a total duration of the tracer release, a target frequency for each dispensation of tracers during the tracer release, an amount of tracers (e.g., salt) released in each dispensation, etc.—in order to generate a detectable tracer signal (e.g., a modulated carrier signal) configured to enable linking of tracers detected at the air sampler to tracers dispensed during this particular tracer release. The air sampler—including a set of sensors 122 (e.g., an aerosol particle counter) configured to detect presence of aerosols in air—can be configured to then record a timeseries of aerosol data representing timestamped amounts of aerosol particles (e.g., aerosolized tracers) detected in air at the set of sensors 122 following execution of the tracer release. The system can then leverage the timeseries of aerosol data, in combination with the known release parameters, to interpret a tracer signal (e.g., a curve or model) representing change in amount of tracers of the tracer type detected at the air sampler over time following dispensation of the tracer test load. Based on characteristics of this tracer signal, the system can then derive a set of aerosol flow metrics—such as an air-change rate and/or an exposure reduction rate—representing flow of aerosol in this particular space.

Further, the system can execute this process in a facility including multiple dispensers and/or multiple air samplers installed throughout the facility to: execute a series of tracer releases—each tracer release, in the series of tracer releases, configured to generate a unique, detectable tracer signal (e.g., unique to the tracer release)—dispensed from many locations across the facility; record timeseries aerosol data (e.g., timeseries amounts of aerosol particles) at each air sampler installed within the facility; and associate amounts of aerosol particles detected at each air sampler with a particular tracer release—dispensed at a particular time and location by a particular dispenser installed in the facility—based on identification of these unique tracer signals in the timeseries aerosol data. Therefore, the system can associate presence and/or magnitude (e.g., amount) of aerosol particles detected at a particular time at the air sampler with a particular tracer dose, in the series of tracer releases, released by the dispenser at a particular dispense time based on identification of the tracer signal in the timeseries of aerosol data recorded by the air sampler.

The system can then leverage this linkage to derive a set of aerosol flow metrics related to detection of this tracer release at the air sampler, such as: an average duration between dispensation of tracers at a particular dispenser (e.g., installed in a particular location) and detection of tracers at a particular air sampler (e.g., installed at a particular location); an average duration between initial detection of a particular tracer release and final detection of the tracer release at the particular air sampler; a proportion of tracers detected at the particular air sampler from tracer releases executed by the particular dispenser; a velocity of aerosol flow between the particular dispenser and the particular air sampler; an air change rate between locations of the dispenser and the air sampler; an aerosol exposure reduction rate between location of the dispenser and the air sampler; an aerosol clearance rate between location of the dispenser and the air sampler; etc. The system can then repeat this process for each tracer release executed by each dispenser installed in the facility and/or for all timeseries aerosol data collected by each air sampler installed in the facility to derive a corpus of aerosol flow metrics for the facility. The system can then store this corpus of aerosol flow metrics in an aerosol behavior profile—representative of aerosol behaviors throughout the facility—for the facility.

The system can also execute Blocks of the method to identify instances and/or triggers for changes in behaviors of aerosols (e.g., flow patterns, dispersion)—and therefore airborne particles more generally—based on differences between amounts of tracers dispensed by the dispenser and amounts of the tracer detected in aerosol samples captured by the air sampler over time, such as due to placement of the air sampler within the space or resulting from changes in environmental controls within the space over time. Accordingly, the system can: track or access data streams for local conditions (i.e., environmental controls) within the space (e.g., air temperature, humidity, time of day, indoor air velocity, human occupancy, activity level) during collection of aerosol samples (e.g., during and/or after a calibration period for the space); and define a calibration factor (or a "calibration model") for the space as a function of such local conditions present in the space.

Further, the system can leverage detection of tracers in the aerosol zone and derived aerosol flow metrics to characterize risk associated with a particular pathogen and/or group of pathogens (e.g., of a particular pathogen type) within the space. In particular, the system can leverage known correlations (e.g., a generic risk model) between environmental factors (e.g., occupancy, cumulative occupancy, activity level, indoor air velocity), characteristics of spaces (e.g., floor area, ceiling height), and risk (e.g., risk of pathogen transmission or exposure) associated with a particular pathogen or pathogen type in these aerosol zones, in combination with aerosol data collected in a particular space to derive a zone-specific risk model for this particular aerosol zone. For example, the system can characterize risk (e.g., risk of transmission per infected person, risk of individual infection, risk of exposure) in a particular aerosol zone—such as for a particular pathogen type, a particular pathogen, and/or a set of pathogens—based on a risk model, derived for the aerosol zone, linking environmental controls (e.g., human occupancy levels, duration of human occupancy, activity level), regional health data (e.g., prevalence of a particular pathogen in a region containing the aerosol zone), measured tracer levels in the aerosol zone (e.g., current detectability of tracers), current aerosol flow metrics (e.g., air change rate) derived for the aerosol zone from timeseries tracer data, measured pathogen levels in the aerosol zone and/or surrounding aerosol zones, etc.—to risk level for a set of pathogens in the aerosol zone. The system can then leverage this zone-specific risk model to derive a set of target environmental controls configured to maintain risk (e.g., associated with a particular pathogen or pathogen type) in the space below a threshold risk defined for the space, such as defined by a manager of the space or a public health advisor.

Further, the system can leverage similarities between tracers and pathogens (e.g., bacteria, viruses) to mimic flow, dispersion, and/or other behaviors—such as represented by air-change rate, clearance rate, and/or exposure reduction rate—of these pathogens within the space. For example, the molecular tracer dispenser can be configured to release tracers (e.g., salt particles, fluorescence particles, DNA barcodes) exhibiting a range of sizes, such that pathogens of different sizes (e.g., within the range of sizes) can be linked to a particular tracer most representative of this particular pathogen. The system can thus interpret aerosol flow patterns (e.g., direction, velocity, clearance rate, exposure reduction rate) in the space—represented by the set of calibration factors—for different types of aerosols (e.g., tracers, pathogens) based on aerosol data collected in the space.

3.1 Deployment+Controlled Release+Detection

The dispenser 110 and the air sampler can be installed within a particular space within a facility—such as fixed to a wall, mounted on a surface (e.g., of a table), or coupled to an electrical outlet—to release tracer test loads of particular tracers in this particular space. Once deployed (e.g., permanently or temporarily installed) to a particular space, the dispenser 110 can release tracer test loads—including controlled amounts (e.g., concentrations), sizes, and identities of tracers—during dispense cycles of controlled durations and executed at controlled frequencies, such as once per minute, once per hour, once per day, once per week, or continuously. Then, approximately concurrent initiation of a dispense cycle, the system can trigger the air sampler 120 to initiate a sampling period. During this sampling period, the air sampler 120 can: ingest air from the space; draw this air through an internal detection chamber 124 proximal the set of sensors 122; and collect timeseries aerosol data—representing presence and/or amount of particles (e.g., aerosols) in air drawn through the air sampler—via the set of sensors 122.

In one implementation, the system includes a network of dispensers 102 (e.g., multiple dispensers 102) distributed throughout different regions of a space or facility. In this implementation, each dispenser 110, in the network of dispensers 102, can include a communication module 120 configured to enable communication (e.g., via Wi-Fi) between the dispenser 110 and the computer system (e.g., a remote computer system, a local server), each other dispenser 110 in the network of dispensers 102, and/or a set of air samplers 104 installed in the particular space. The network of dispensers 102 can be configured to release tracer test loads—including known amounts of tracers of known concentrations, tracers types, and/or identities—at fixed frequencies (e.g., once-per-minute, once-per-hour, once-per-day, once-per-week) in concert with collection of aerosol samples by one or more air samplers 104 installed in the space or facility. In particular, the system can trigger each dispenser 110, in the network of dispensers 102, to dispense a tracer test load, in a set of tracer test loads, at controlled and/or scheduled release times, each tracer test load, in the set of tracer test loads, including known (or "standardized") concentrations of a set of standardized tracers, such that each tracer test load is released at approximately the same time and includes approximately identical concentrations of an identical set of standardized tracers. Therefore, by coordinating timing, concentration, and identity of tracers released into the space and/or facility across the network of dispensers 102, the system can derive insights related to detectability, flow, and/or dispersion of aerosols in different regions of the space and/or facility.

4. System: Dispenser+Air Sampler

Generally, the aerosol detection system 100 can include a set of dispensers (e.g., one or more dispensers) and a set of air samplers (e.g., one or more air samplers) deployed within a facility. Each dispenser can be configured to periodically release known quantities of aerosolized tracers (i.e., tracer test loads) into surrounding ambient air; and each air sampler can be configured to ingest surrounding ambient air and detect aerosols—including aerosolized tracers released by the set of dispensers—present in ingested ambient air via a set of sensors 122 (e.g., a particle counter) of the air sampler.

Furthermore, the aerosol detection system 100 includes (or is connected to) a computer system—such as a local computer system (e.g., a local server or controller) located within the facility or a remote computer system (e.g., a computer network)—and connected to the set of dispensers and/or set of air samplers via a wired or wireless connection. The computer system can be configured to interface with the set of dispensers and the set of air samplers to execute Blocks of the method S100. For example, the computer system can: selectively activate a dispenser, in the set of dispensers, to trigger release of a tracer test load; and selectively activate an air sampler, in the set of samplers, to trigger the set of sensors 122 to capture timeseries amounts of aerosols in air passing through the air sampler.

In one variation, the aerosol detection system 100 can further include a display—such as integrated into the dispenser and/or air sampler—configured to render results, prompts, and/or statuses (e.g., generated by the computer system). For example, the dispenser can include a display configured to: indicate a current status of the dispenser, such as during, immediately-preceding, immediately-succeeding, and/or in-between execution of tracer releases; render instructions for a user corresponding to the current status; render a set of aerosol flow metrics—such as a current air-change rate, a current aerosol clearance rate, a current exposure reduction rate, a current infection exposure risk, a current composite risk score—derived by the computer system for a preceding tracer release; render prompts to modify and/or regulate environmental controls in the space; and/or render prompts to modify and/or regulate ventilation systems in the space.

Additionally and/or alternatively, in another variation, the aerosol detection system 100 can interface with a user portal (e.g., a native application, a web application) executing on a user computing device—such as a smartphone, a tablet, a desktop computer, etc.—to communicate results, prompts, and/or system statuses to a user or group of users affiliated with the facility.

In one variation, the aerosol detection system 100 can include a set of airflow regulators—such as deployed proximal, coupled to, or integrated into a dispenser and/or air sampler—configured to regulate flow of aerosolized tracers in the environment. For example, the aerosol detection system 100 can include a fan proximal and/or integrated into the dispenser and configured to direct flow of aerosolized tracers—released by the dispenser—in a particular direction, such as upward into an airstream and/or toward a particular air sampler or space within a facility containing the dispenser. Additionally and/or alternatively, in another example, the aerosol detection system 100 can include a fan proximal and/or integrated into the air sampler and configured to: direct flow of aerosolized tracers in air toward an inlet of the air sampler; and/or promote mixing of aerosols in air surrounding the air sampler.

In one implementation, the air sampler and the dispenser can be configured to wirelessly communicate with one another. For example, the dispenser can be configured to automatically trigger the air sampler to collect an aerosol sample—in preparation for or responsive to dispensation of a tracer test load—responsive to receiving a command from the computer system. Additionally and/or alternatively, in another example, the air sampler can be configured to automatically trigger the dispenser to dispense a tracer test load—in preparation or responsive to initiating capture of aerosol data by the set of sensors 122—responsive to receiving a command from the computer system and/or based on a dispense schedule or protocol loaded onto a (local) controller 126 of the air sampler.

4.1 Tracer Dispenser

The aerosol detection system 100 includes a tracer dispenser (hereinafter "dispenser") configured to intermittently release tracer test loads (e.g., droplets of tracers in solution)—containing known quantities of tracers (e.g., salt, fluorescent material, genetic material) in solution—into the external environment (e.g., surrounding the dispenser). Generally, the dispenser is configured to transiently or semi-permanently install in a particular environment.

In one implementation, the dispenser includes: a reservoir 112 containing tracers in solution; a dispenser communication module 114 configured to receive commands from the computer system; and an actuator 116 configured to transiently release tracer test loads—including aerosolized tracers in solution—from the reservoir 112 and into the indoor environment based on a command received by the dispenser communication module 114. The dispenser can further include a power supply (e.g., a battery).

The dispenser can be configured to output a tracer test load of a known volume and including a known concentration of tracers, such that the system can compare a detected tracer level (e.g., tracer quantity) to a real tracer level (e.g., based on the known volume and the known concentration) in the tracer test load released by the dispenser. Further, the dispenser can be configured to intermittently release tracer test loads into the space, such as at a target frequency and/or aligned with collection of aerosol samples by the air sampler. The system can then leverage these tracers as markers in aerosol samples ingested by the air sampler. In particular, the dispenser can be configured to output a set of tracers configured to mimic flow, distribution, and/or dissipation of pathogens (e.g., output in human saliva) in the space. For example, the dispenser can be configured to output a set of tracers, each tracer in the set of tracers configured to mimic a particular pathogen, in a set of pathogens, detectable in the space. In one example, a tracer test load can include: a first tracer exhibiting sizes (e.g., relatively small sizes) within a first size range matched to pathogens exhibiting sizes within the first size range; and a second tracer exhibiting sizes (e.g., relatively large sizes) within a second size range matched to pathogens exhibiting sizes within the second size range; and a third tracer exhibiting sizes (e.g., relatively moderate sizes) within a third size range between the first and second size range. Therefore, the system can leverage detection of these tracers—which can exhibit different flow or distribution patterns within a space based on their sizes—to better predict flow or distribution of pathogens of different sizes within the space.

In one implementation, the dispenser 110 is configured to receive a replaceable cartridge (i.e., the reservoir 112)—loaded with a set of tracer samples (e.g., highly-concentrated tracer samples)—to dispense particular tracers, contained in the set of tracer samples in the cartridge, into the space. Over time, this cartridge can be replaced to replenish a supply of tracer samples available for dispensation by the dispenser 110 and/or to supply the dispenser 110 with different types of tracer samples.

In one example, the dispenser can include: a cartridge receptacle; a loading vessel configured to prepare a tracer test load—including a known concentration of tracers in a known volume of an aqueous solution (e.g., a salt-water solution); a fluid reservoir 112 configured to supply metered volumes of the aqueous solution to the loading vessel; and a sprayer (e.g., a nebulizer) fluidly coupled to the loading vessel and configured to release (airborne) aerosolized droplets of the tracer test load into air in the space. In this implementation, the dispenser can be configured to receive a replaceable (e.g., disposable) cartridge including: an array of tracer reservoirs 112, each tracer reservoir (e.g., a blister reservoir, a capsule, a compartment) loaded with a low-volume, highly-concentrated tracer test load including tracers of particular sizes (e.g., within a narrow size range and/or a variety of sizes), concentrations, and/or identities (e.g., genetic identities); and a connector configured to transiently engage the cartridge receptacle and locate the array of tracer reservoirs within the dispenser. The dispenser can then selectively release one or more tracer test loads into the loading vessel for combination with a volume of the aqueous solution to generate a tracer test load exhibiting a particular concentration and identity of tracers. The dispenser can then release this tracer test load into the space via the sprayer. Therefore, the dispenser can be configured to regulate and/or track tracer concentration, tracer identity, and/or tracer size of tracer test loads dispensed.

In one implementation, the dispenser is configured to dispense tracer test loads including known concentrations of salt in solution. In another implementation, the dispenser is configured to dispense tracer test loads including known concentrations of fluorescent material in solution. In yet another implementation, the dispenser is configured to dispense tracer test loads including known concentrations of genetic material (e.g., DNA barcodes) in solution. However, the dispenser can be configured to output tracer test loads including any type of detectable tracer, such as any tracer particle, liquid tracer, genetic tracer including DNA (e.g., DNA barcodes), fluorescent tracer including fluorescent material, salt, etc.

4.2 Air Sampler

In one implementation, the aerosol detection system 100 includes an air sampler configured to draw air from an external environment over a particle detector for detection of aerosol particles—including tracers released into the external environment by the dispenser—present in air at the air sampler. In particular, the particle detector can include a set of sensors 122 configured to generate signals representing amounts of particles (e.g., aerosols) present in air ingested by the air sampler. Once deployed (e.g., permanently or temporarily installed) in a particular space, the air sampler can ingest air from the space over time and draw this air over the set of sensors 122 for detection of aerosol particles in aerosol samples collected from the space, such as once per day, once per hour, once per minute, or continuously.

The air sampler includes a detector—including a set of sensors 122—configured to detect presence of aerosols in air flowing over the set of sensors 122. For example, the air sampler can include a set of sensors 122 (e.g., a particle counter) configured to track an amount (e.g., quantity, concentration) of aerosol particles present in air—over a particular time period—at the set of sensors 122. In particular, the air sampler can include: a set of sensors 122—such as an aerosol particle counter—configured to detect presence of aerosols in air flowing over the set of sensors 122; and a sampler communication module configured to enable communication (e.g., via Wi-Fi) between the dispenser and the computer system (e.g., a remote computer system, a local server), each other dispenser in a network of dispensers deployed in the space, and/or a set of air samplers installed in the space.

In one variation, the air sampler 120 includes a set of indicators—such as arranged on an exterior (e.g., of a housing) of the air sampler 120. In this variation, the set of indicators can be configured to signal detection of tracers—such as of a particular tracer type—at the air sampler during execution of a tracer test. The air sampler 120 can thus include the set of indicators to signal initial detection of tracers at the air sampler and/or completion of a tracer test to an operator present in the bioaerosol zone during execution of the tracer test. For example, the air sampler 120 can include a set of colorimetric sensors configured to output an optical signal representing an amount of tracers of the tracer type detected at the set of colorimetric sensors.

Generally, the air sampler is configured to transiently or semi-permanently install in a particular environment (e.g., an enclosed space within a building), such as such as fixed to a wall, mounted on a stand, or standing on a floor of a particular room. Alternatively, the air sampler can be coupled with a mobile apparatus (e.g., a manual or autonomously cart, an autonomous aerial vehicle) configured to transport the air sampler about a space or facility. The air sampler can then directly sample air from this environment and locally (and/or remotely) implement pathogen detection. For example, the air sampler can be mounted (e.g., transiently, permanently) to a mobile robot (e.g., a UGV) configured to autonomously navigate between different rooms within an office building to monitor pathogen levels across each of these rooms. Further, the system can include multiple air samplers installed throughout a particular facility (e.g., one per floor in an office building). For example, the system can include a docking station (e.g., a charging docking station) configured to house a set of air samplers, such that each air sampler can be deployed from the docking station to a particular space (e.g., an office, a classroom, a store, a bathroom) within a larger facility (e.g., an office building, a school, a mall, an airport).

In one implementation, the air sampler and the dispenser can be configured to wirelessly communicate with one another, such that the dispenser can automatically trigger the air sampler to collect an aerosol sample in preparation for or responsive to dispensation of a tracer test load and/or the air sampler can trigger the dispenser to dispense a tracer test load in preparation or responsive to collection of an aerosol sample. For example, the dispenser can include a dispenser communication module 114 configured to receive commands for releasing tracer test loads. Similarly, the air sampler can include a sampler communication module configured to receive commands for collecting aerosol samples. In this example, the aerosol detection system 100 can include a controller 126 loaded with a control program—received from the computer system—and configured to: selectively trigger the dispenser to release tracer test loads into the environment according to a dispense schedule defined by the control program; and selectively trigger activation of the air sampler according to the dispense schedule.

4.3 Pathogen Detection

In one variation—as described in U.S. patent application Ser. No. 17/709,213, filed on 30 Mar. 2022, which is incorporated in its entirety by this reference—the air sampler can be configured to collect aerosol samples within the air sampler for detection of microbes (e.g., pathogenic and/or nonpathogenic microbes) in air within the external environment. For example, the air sampler can ingest air from the space over time and draw this air over an internal collection subsystem to collect aerosol samples from the space. An internal genetic material load detector, selective pathogen detector, or DNA sequencer within the air sampler can then process these aerosol samples to detect presence and/or magnitude (e.g., pathogen level) of various genetic material (or viral and/or bacterial pathogens specifically) in the space, and the air sampler can then assemble detected presence and/or magnitudes of genetic material thus detected in the space over time into pathogen data representing presence and/or magnitude of genetic material in air within the space (e.g., at a particular time and/or over time). Alternatively, aerosol samples collected by the air sampler can be intermittently returned to a lab for processing and diagnostics, such as by: removing a first cartridge—including a first collector plate containing a first aerosol sample—from the air sampler; installing a second cartridge into the air sampler in preparation for a next air capture period; and returning the first cartridge to the lab for remote processing.

In one implementation, the air sampler can include an air-capture module configured to draw air from the environment through the inlet of the body via electrostatic forces. This "electrostatic air sampler" can include: a charging element; a sampling medium in the form of a collector plate; and a power supply air-capture module configured to apply a voltage across the collector plate. For example, the electrostatic air sampler can include: an inlet configured to transfer an aerosol sample from a surrounding space into the electrostatic air sampler; a collector plate configured to receive the aerosol sample and collect pathogens present in the aerosol sample; and a corona wire configured to cooperate with the collector plate to draw the aerosol sample through the inlet via electrostatic forces. In particular, in this example, the air sampler can be configured to supply a voltage between the corona wire and the collector plate to enable ionization of particles present in the aerosol sample, thereby accelerating these particles through the inlet and onto the collector plate.

Alternatively, in another implementation, the air sampler can include an air-capture module including a pump coupled to the inlet of the air sampler and configured to draw air from the inlet and onto a sampling medium within a body of the air sampler at a target rate (e.g., once cubic foot per second). This "pump-based air sampler" can include a sampling medium in the form of a filter cartridge (e.g., a PTFE filter cassette). For example, the pump-based air sampler can actuate the pump to draw air through the inlet and through the filter cartridge such that particles in the air collect on a filter within the filter cartridge. The pump-based air sampler can thus continue to actuate the pump to dry and thus concentrate these particles on the filter over a sampling period, such as of a predefined duration (e.g., 30 seconds).

4.4 Variation: Unitary Dispensing & Sampling Device

In one variation, the dispenser and the air sampler can be combined into a singular device configured to both dispense tracer test loads (e.g., aerosolized tracers) and detect presence of aerosols in air.

In particular, in this variation, the aerosol detection system 100 can include a tracer test device—including both a dispenser and an air sampler forming a unitary device—installed in an indoor environment and including: a communication module configured to receive commands from the computer system for operation of the testing device; a reservoir 112—such as within a (replaceable) cartridge transiently coupled to the actuator 116—containing tracers (e.g., salt, fluorescent material, genetic material) in solution; an actuator 116 configured to release tracer test loads—containing aerosolized tracers—from the dispenser and into the indoor environment; and a set of sensors 122 configured to record timeseries of aerosol data representing presence of particles in air present at the air sampler in the indoor environment. In this variation, the controller 126 can be configured to: selectively trigger release of tracer test loads by the nebulizer according to a dispense schedule (e.g., received from the computer system); and selectively trigger the set of sensors 122 to record timeseries aerosol data according to a sampling schedule and/or based on the dispense schedule.

Additionally and/or alternatively in this variation, the tracer test device can include a display, such that the tracer test device can: dispense tracer test loads into the environment; collect timeseries aerosol data derived from ambient air ingested at the tracer test device following dispensation of a tracer test load; and render results, statuses, and/or prompts viewable to a user at the tracer test device.

5. Monitoring Aerosol Behaviors

During a test period (or "calibration period"), the system can execute evaluations (hereinafter "tracer tests") to derive insights related to aerosol behaviors—such as related to flow, movement, and/or distribution patterns—in a particular defined space (hereinafter a "aerosol zone") within a facility. In particular, the system can: trigger the dispenser to intermittently (e.g., at a fixed frequency, pseudo-randomly) release tracer test loads—containing known quantities of tracers (e.g., salt molecules) into a space; trigger the set of sensors 122 of the air sampler to track a quantity of tracers present in air at the air sampler during a sampling period succeeding release of these tracer test loads in the space; and characterize aerosol behaviors—such as velocity and/or direction of aerosol flow, aerosol clearance rate, exposure reduction rate, etc.—in the space based on the quantity of tracers detected at the air sampler over a duration of the sampling period.

In one implementation, the system can intermittently (e.g., at a fixed frequency, pseudo-randomly) execute a tracer test during a test or calibration period to evaluate movement and/or flow of aerosols in a space. For example, the system can execute a series of calibration periods according to a target frequency—such as once-per-day, once-per-week, once-per-month, etc.—to recalibrate and/or update an aerosol movement profile stored for a particular space. Alternatively, in another example, the system can: execute an initial calibration period to derive an aerosol movement profile for the particular space; and periodically execute subsequent calibration periods based on changes in environmental conditions—such as occupancy levels, HVAC settings, known transmission rates and/or infection rates associated with a particular pathogen—in the particular space.

In preparation for execution of a tracer test, the aerosol detection system 100 can be deployed to a facility for installation within a particular aerosol zone and/or throughout a group of aerosol zones within the facility. In one implementation, the aerosol detection system 100—such as including one dispenser and one or more air samplers—can be transiently deployed and installed within the aerosol zone for a defined duration (e.g., 10 minutes, 30 minutes, 1 hour, 24 hours) to enable execution of a tracer or a series of tracer tests during this defined duration. Once installed in the aerosol zone, the system can execute a tracer test accordingly and interpret a set of aerosol metrics for the aerosol zone based on timeseries aerosol data recorded during execution of the tracer test. The aerosol detection system 100 can then be retrieved from the aerosol zone—such as for installation in another aerosol zone within the facility and/or for storage elsewhere—upon completion of the tracer test or series of tracer tests.

For example, an operator affiliated with the aerosol zone may locate the dispenser 110 and the air sampler 120 in the aerosol zone (e.g., a in a target configuration) in preparation for execution of a tracer test. Once deployed within the aerosol zone, the system can: initiate a test period of a target duration (e.g., 10 minutes, 30 minutes, 1 hour, 24 hours); execute one or more tracer tests—including release of a tracer test load by the dispenser and recording of timeseries aerosol data by the air sampler—within this test period; and, in (near) real-time, output results—such as aerosol metrics (e.g., air-change range, aerosol reduction rate, air velocity and/or direction), risk levels associated with one or more pathogens, effectiveness of various interventions or environmental controls (e.g., HVAC settings, occupancy levels, activity levels)—of each tracer test.

In one example, the system can: trigger dispensation of a tracer test load to initiate a tracer test; derive a tracer signal from timeseries aerosol data collected during execution of the tracer test; derive a set of aerosol metrics representing aerosol flow and/or movement in the aerosol zone based on the tracer signal; and report these aerosol metrics and/or additional insights to a manager affiliated with the aerosol zone in (near) real-time. In this example, the system can therefore derive deep insights into flow and movement of aerosols in the aerosol zone via execution of a (relatively) brief tracer test (e.g., a 10-minute test, 20-minute test, i-hour test).

Alternatively, in another implementation, the aerosol detection system 100—such as including a set of dispensers (e.g., one or more dispensers) and a set of air samplers (e.g., one or more air samplers)—can be deployed to a facility for permanent or semi-permanent installation within one or more aerosol zones within the facility. In this implementation, once initially installed, the system can periodically execute tracer tests in the aerosol zone and/or within the facility as described above, such as based on a dispense schedule (or "test schedule") defined for the facility and/or responsive to detected environmental changes within the facility.

5.1 Aerosol Zone: One Dispenser+One Air Sampler

In one implementation, the aerosol detection system 100 can include a dispenser and an air sampler transiently deployed in a particular aerosol zone (e.g., within a facility). The computer system can then cooperate with the dispenser and the air sampler to: execute a tracer test in this particular aerosol zone during a test period, such as by triggering release of a tracer test load—including aerosolized tracers—by the dispenser and triggering the set of sensors 122 of the air sampler to capture a timeseries of aerosol data; derive a tracer signal—representing change in particle amounts detected at the air sampler—based on this timeseries of aerosol data; and predict a set of aerosol flow metrics—representative of aerosol behaviors in the aerosol zone—based on characteristics of the detected tracer signal.

5.1.1 System Setup

To install the aerosol detection system 100 in preparation for the tracer test, an operator may: locate the dispenser in a target dispenser location (e.g., defined by the computer system and/or manually selected by the operator), such as in a center of the aerosol zone and/or a location predicted to exhibit minimal variations or turbulence in airflow (e.g., relative the aerosol zone); locate the air sampler in a target sampler location, such as predicted to intersect a flow path of aerosolized tracers released from the dispenser; and confirm connection (e.g., wired or wireless) of the dispenser and/or air sampler to the computer system. The operator may then initiate the tracer test, such as by manually engaging the actuator 116 of the dispenser and/or by triggering initiation within a web or native application executing on the user's computing device and connected to the computer system.

In particular, the operator may locate the air sampler at the target sampler location defining a distance from the target dispenser location within a target distance range (e.g., between 1 foot and 2 feet, between 6 feet and 8 feet, between 1 meter and 2 meters) defined for the aerosol zone. By thus locating the air sampler a particular distance—within the target distance range—from the dispenser, the air sampler can be configured to ingest and detect aerosolized tracers, released in the tracer test load by the dispenser, exhibiting aerosol velocities within a threshold deviation of air velocity at the air sampler and exhibiting relatively high concentrations, thereby: minimizing error in quantification of aerosolized tracers at the air sampler; and maximizing a signal-to-noise ratio by increasing quantity of aerosolized tracers present at the air sampler.

For example, the dispenser can be configured to release a tracer test load—including aerosolized tracers—into the aerosol zone, such that these aerosolized tracers exhibit an initial aerosol velocity exceeding an air velocity in the aerosol zone. The air sampler can therefore be located at least a minimum distance away from the dispenser in order to enable reduction of aerosol velocity prior to detection—such that, at a time of detection, these aerosolized tracers exhibit an aerosol velocity within a threshold deviation of the air—thereby enabling accurate detection of amounts of aerosolized tracers at the air sampler. Further, in this example, the air sampler can be located within a maximum distance from the dispenser in order to limit dispersion of aerosolized tracers within the aerosol zone prior to detection at the air sampler, thereby increasing detectability of these aerosolized tracers at the air sampler.

Additionally, in order to further increase detectability of aerosolized tracers at the air sampler, the operator may locate the air sampler at the target sampler location defining an orientation—relative the target dispenser location—corresponding to a direction of aerosol flow from the dispenser.

In one implementation, the user may manually execute a directionality test in the aerosol zone—prior to installing the air sampler within the aerosol zone—in order to predict the target sampler location for the air sampler. For example, the user may: locate the air sampler in the target sampler location; manually trigger release of a tracer test load (e.g., over a shortened dispense period); and visually inspect flow of aerosolized tracers, in the tracer test load, outward from the dispenser to identify a primary direction and/or pathway of aerosol flow from the dispenser. The operator may then locate the air sampler at the target sampler location intersecting this pathway of aerosol flow from the dispenser.

By thus locating the air sampler along this pathway of aerosol flow, the air sampler can be configured to: initially ingest aerosolized tracers, dispensed in the tracer test load, at a minimum duration from initial release of these aerosolized tracers by the dispenser, thereby reducing time to detection following dispensation; and, via the set of sensors 122, detect a maximum amount (e.g., concentration) of aerosolized tracers at an initial time of detection—such as prior to increased dissipation of aerosolized tracers within the aerosol zone—thereby increasing a signal-to-noise ratio of the resulting tracer signal.

5.1.1.1 Target Configuration

In one implementation, the system can: calculate a target configuration for the air sampler and the dispenser within the aerosol zone; and prompt the operator to locate the air sampler and the dispenser in this target configuration in preparation for a tracer test. For example, the system can: access a set of zone characteristics—such as a set of dimensions, a total volume, a layout, an activity type or types (e.g., office work, exercise, singing, eating) associated with the aerosol zone, etc.—defined for the aerosol zone; access a set of environmental controls (e.g., current and/or historical environmental controls)—such as a current or average occupancy level, duration of human occupancy, a set of HVAC settings and/or ventilation settings, etc.—defined for the aerosol zone; and, based on the target distance range, the set of zone characteristics, and/or the set of environmental controls, calculate a target configuration—defining the target dispenser location and the target sampler location—for deployment of the aerosol detection system 100 within the aerosol zone.

Additionally and/or alternatively, in this implementation, the system can: calculate the target dispenser location based on the set of zone characteristics and/or the set of environmental controls; generate a prompt to execute a directionality test in the aerosol zone prior to installing the air sampler within the aerosol zone; transmit the prompt to the operator; and, in response to confirming execution of the directionality test, prompt the user to specify a direction of aerosol flow from the dispenser. Based on this direction and the target dispenser location, the system can then: calculate the target sampler location; generate a prompt to locate the air sampler at the target sampler location; and transmit the prompt to the operator.

5.1.1.2 Setup Verification

In one implementation, the system can verify a setup configuration of the aerosol detection system 100 within the aerosol zone prior to execution of a tracer test. For example, the system can: generate a prompt to confirm deployment of the dispenser and the air sampler in the aerosol zone; and transmit the prompt to the operator, such as via a mobile device (e.g., a smartphone, a tablet) accessed by the operator or via a display connected and/or integrated into the dispenser. Then, in response to receiving confirmation of deployment from the operator, the system can: access a first geolocation of the air sampler (e.g., via RSS-based localization techniques) within the aerosol zone; access a second geolocation of the dispenser within the aerosol zone; and calculate a distance between the first geolocation and the second geolocation. Then, in response to the distance falling within a target distance range defined for the aerosol zone, the system can: verify the setup configuration; and enable execution of a tracer test in the aerosol zone. Alternatively, in response to the distance falling outside a target distance range defined for the aerosol zone, the system can: generate a prompt to adjust (e.g., increase or decrease) the distance between the dispenser and the air sampler; and transmit the prompt to the operator. The system can then repeat this process until the distance falls within the target distance range.

5.1.2 Tracer Test: Release Parameters

Block S110 of the method S100 recites: triggering the dispenser to release a tracer test load—according to a set of release parameters—into ambient air in the aerosol zone, the tracer test load including a concentration of tracers of a tracer type. Generally, the system can define a set of release parameters for a particular tracer test and/or for a particular aerosol zone, such as: a duration of a dispense period corresponding to release of the tracer test load; a start time of the dispense period; an end time of the dispense period; aerosolization rate of tracers dispensed from the reservoir 112 and into ambient air in the aerosol zone; a target ejection force for releasing the tracer test load from the dispenser; a target aerosolization jet distance; an amount (e.g., concentration, quantity) of tracers released in the tracer test load; a tracer type (e.g., a size, a reactivity, a class, a particular molecule or particle); etc. The system can then record the set of release parameters implemented for the tracer test for combining with timeseries aerosol data collected during execution of the tracer test.

Generally, the dispenser can be configured to receive a command from the computer system to execute a release of a tracer test load over a dispense period according to a set of release parameters. The actuator 116 can then release the tracer test load—including aerosolized tracers in solution—from the reservoir 112 of the dispenser and into the indoor environment based on the command.

In one example, the dispenser can include a reservoir 112—such as a replaceable cartridge and/or fixed reservoir 112—loaded with salt particles (e.g., NaCl particles) in solution. To initiate a tracer test, the computer system can return a command to the dispenser communication module 114 to release a tracer test load—including aerosolized salt particles in solution—over a dispense period according to a set of release parameters including a start time of the dispense period (e.g., an initial dispense time) and a duration of the dispense period. Then, at the specified start time, the actuator 116 of the dispenser can aerosolize a metered volume of salt particles in solution—drawn from the reservoir 112—for release into air in the aerosol zone at a particular aerosolization rate over the duration of the dispense period.

In one implementation, the computer system can return a command to the dispenser—such as via a dispenser communication module 114—to release the tracer test load over a dispense period according to the set of release parameters defined for this particular tracer test and/or this particular aerosol zone. In one example, the computer system can automatically return a command to the dispenser to execute a release of the tracer test load according to the set of release parameters responsive to confirming setup of the aerosol detection system 100 in the aerosol zone. In another example, the computer system can return a command to the dispenser to execute a release of the tracer test load according to the set of release parameters responsive to receiving a request to initiate the tracer test from a user computing device accessed by the operator or any other user affiliated with the aerosol zone or facility containing the aerosol zone.

Additionally and/or alternatively, in another implementation, the operator may manually select a user control (e.g., a button, a switch) arranged on the dispenser configured to trigger initiation of a tracer test. In this implementation, the computer system can: receive a query for release parameters from the dispenser; access the set of release parameters defined for the tracer test in the aerosol zone; and return a command to the dispenser to execute a release of the tracer test load according to the set of release parameters. Additionally and/or alternatively, the computer system can preload the set of release parameters onto the dispenser.

5.1.2.1 Tracer Test Load: Multiple Tracer Types

In one implementation, the reservoir 112 can be loaded with a volume of tracers—including tracers of a set of tracer types—in solution. In this implementation, the system can similarly trigger release of a tracer test load—including concentrations of tracers of the set of tracer types in solution—into ambient air in the aerosol zone according to a set of release parameters.

For example, the reservoir 112 can include: a first concentration of tracers of a first type—such as tracers exhibiting sizes within a first size range and/or exhibiting a first target reactivity—in solution; and a second concentration of tracers of a second type—such as tracers exhibiting sizes within a second size range and/or exhibiting a second target reactivity—in solution. Then, to execute a first tracer test during a first test period, the system can trigger release of a tracer test load into ambient air in the aerosol zone, the first tracer test load including: aerosolized tracers of the first type in solution; and aerosolized tracers of the second type in solution. During the test period, the air sampler can: record a first timeseries of particle amounts representing amounts of aerosols of the first type detected at the air sampler; and a second timeseries of particle amounts representing amounts of aerosols of the second type detected at the air sampler. Further, during the test period, the computer system can access the first and second timeseries of particle amounts recorded at the air sampler, such as at a target logging frequency (e.g., every i-second interval, every 15-second interval).

Then, in the preceding example, in response to completion of the tracer test, the computer system can: derive a first tracer signal—representing changes in amounts of tracers of the first type in air detected at the air sampler during the test period—based on the first timeseries of particle amounts and the set of release parameters; and derive a second tracer signal—representing changes in amounts of tracers of the second type in air detected at the air sampler during the test period—based on the second timeseries of particle amounts and the set of release parameters. The computer system can therefore: predict a first air-change rate for aerosolized particles of the first type, in the aerosol zone during the test period, based on characteristics of the first tracer signal; and predict a second air-change rate for aerosolized particles of the second type, in the aerosol zone during the test period, based on characteristics of the second tracer signal.

System can therefore predict different air-change rates for different types of aerosolized particles—which may correspond to different types of pathogens (e.g., a virus, bacteria, microbe, pathogens within a particular size range, pathogens exhibiting a particular reactivity)—within the aerosol zone.

5.1.3 Tracer Test: Timeseries Aerosol Data

Block S120 of the method S100 recites: recording a timeseries of aerosol data via a set of sensors 122 integrated into the air sampler arranged in a second location within the aerosol zone, the first timeseries of aerosol data representing amounts of aerosolized particles in ambient air ingested by the first air sampler during the first test period in Block S120.

Generally, in Block S130, the air sampler (e.g., via a local controller) can access the set of sensors 122 (e.g., one or more particle counters) and record aerosol data—corresponding to amounts (e.g., quantity, concentration) of aerosol particles (e.g., of different types) detected in air at the air sampler—at each sensor, in the set of sensors 122, at a series of time increments concurrent with dispensation of the tracer test load by the dispenser.

The system can trigger the air sampler to record aerosol data during execution of a tracer test. In one implementation, the system can trigger the air sampler to initiate recording the timeseries of aerosol data via the set of sensors 122. In one implementation, the system can return a command to the air sampler to begin recording the timeseries of aerosol data, via the set of sensors 122, prior to initiation of a dispense period at the dispenser. The air sampler—such as via a local controller 126—can then trigger the set of sensors 122 to begin recording aerosol data before release of a tracer test load, during the dispense period, at the dispenser.

In one implementation, the air sampler can record aerosol data continuously and/or semi-continuously, such as at each 200-millisecond interval. Alternatively, in another implementation, the air sampler can selectively sample aerosol data intermittently (e.g., once every i-second interval, once every 5-second interval, once every 30-second interval) to reduce power consumption and minimize data files, such as prior to completion of the dispense period. In each of these implementations, the air sampler can then transmit the aerosol data to the computer system at a particular logging frequency (e.g., once-per-second, once every 15-second interval, once every 30-second interval).

5.1.4 Tracer Signal Detection

Block S130 of the method S100 recites: deriving a tracer signal representing changes in amounts of tracers of the first type in air detected at the air sampler during the test period based on the timeseries of aerosol data and the set of release parameters.

Generally, the system—such as via the computer system—can store the set of release parameters for a particular tracer test in a test container, in a set of test containers, corresponding to execution of the particular tracer test in the aerosol zone. During execution of the tracer test, the system can: access timeseries aerosol data from the air sampler at a target logging rate, as described above; and record this timeseries aerosol data to the test container generated for the tracer test. Then, the system can: leverage the set of release parameters defined for the tracer test to: identify a target sampling window—such as defining an initial time and a final time—within the test period corresponding to the tracer signal; and derive the tracer signal based on timeseries aerosol data collected during this target sampling window.

In particular, the system can: trigger recording of a first timeseries of aerosol data via the set of sensors 122 integrated into the air sampler over a duration of a test period, the first timeseries of aerosol data representing amounts of aerosolized particles in ambient air ingested by the first air sampler during the test period; and trigger release of a tracer test load into ambient air in the aerosol zone—over a dispense period within a test period—according to a first set of release parameters including an initial dispense time corresponding to a start of the dispense period, a duration of the dispense period, and/or a dispensation rate representing a rate of release of aerosolized tracers from the dispenser during the test period. Then, in response to completion of the test period, the system can: calculate a target sampling window—defining an initial sampling time and a final sampling time—based on the first set of release parameters; extract a second timeseries of aerosol data—collected during the target sampling window—from the first timeseries of aerosol data; and derive the tracer signal—representing changes in amounts of tracers of the first type in air detected at the air sampler during the sampling window between the initial sampling time and the final sampling time—based on the second timeseries of aerosol data.

In one implementation, the system can define the target sampling window to align with a period of decay (e.g., exponential decay) in amount of tracers of the tracer type detected at the air sampler. In particular, in this implementation, the system can derive a tracer signal—such as a decay curve representing decrease (e.g., exponential decay) in amount of tracers of the first type over the target sampling window—based on timeseries aerosol data collected by the air sampler during the target sampling window, such that: the initial sampling time corresponds to a maximum amount (e.g., concentration, quantity) of tracers of the tracer type; and the final sampling time corresponds to a minimum amount or "baseline" amount of tracers of the tracer type. The system can thus derive the tracer signal or "curve" (e.g., a decay curve, a calibration curve) configured to model change in amount (e.g., concentration, quantity) of tracers of the particular tracer type over time throughout the target sampling window. For example, the system can derive an exponential decay curve representing change in amount of tracers of the tracer type over time during the target sampling window.

In one example, the system can: access a baseline amount of tracers of the tracer type defined for the aerosol zone, such as recorded during an initial time period within the test period—prior to the dispense period—and/or derived for the aerosol zone during one or more preceding test periods; at each timepoint represented in the timeseries of bioaerosol data, estimate an amount of tracers, of the tracer type, originating from the tracer test load based on a difference between an amount of tracers recorded at the timepoint and the baseline amount of tracers; identify a maximum amount of tracers of the first tracer type at a first time in the timeseries aerosol data; identify a final amount of tracers—corresponding to the baseline amount and/or within a threshold deviation of the baseline amount—at a second time, succeeding the first time, in the timeseries aerosol data; and select the target sampling window spanning from the first time to the second time. Then, the system can: isolate timeseries of aerosol data collected during the selected sampling window; and leverage statistical models and/or linear regression techniques—such as by implementing a log-linear fit—to derive a tracer decay curve (i.e., a tracer signal) representing or modeling decay in amount of tracers of the tracer type detected by the air sampler over time, during the sampling window.

In another implementation, the system can: access a set of predefined rules for selection of the target sampling window in the aerosol zone; access the set of release parameters defined for the tracer test; and select the sampling window based on the set of predefined rules and the set of release parameters.

5.1.5.1 Signal-Processing Model

In one implementation, the system can derive a signal-processing model linking aerosol data to tracer signals generated by tracer test loads released in the aerosol zone based on the first timeseries of aerosol data and the first tracer signal.

Generally, in this implementation, the system can: access a first timeseries of aerosol data recorded by the air sampler during execution of a tracer test, within a test period, in the aerosol zone; identify a target sampling window, within the test period, based on release parameters and/or the first timeseries of aerosol data; derive a first tracer signal based on the first timeseries of aerosol data, the target sampling window, and/or the set of release parameters as described above; implement regression, artificial intelligence, machine learning, deep learning, and/or other techniques to derive links or correlations between these timeseries aerosol data and the tracer signal in this aerosol zone; and generate a signal-processing model—such as specific to the aerosol zone and/or the tracer type—to accurately derive tracer signals from release parameters and timeseries aerosol data collected in the aerosol zone. Over time, the system can: collect additional timeseries aerosol data recorded in the aerosol zone; derive tracer signals from these aerosol data; and further update the signal-processing model based on these aerosol data, corresponding release parameters, and derived tracer signals.

For example, during an initial time period, the system can interpret a series of tracer signals (e.g., exponential decay curves) derived from timeseries aerosol data collected during execution of a series of tracer tests in the aerosol zone, as described above. The system can then leverage the series of tracer signals—in combination with timeseries aerosol data collected during execution of the series of tracer tests—to derive a signal-processing model configured to ingest a timeseries aerosol data and automatically return a representative tracer signal configured to represent or model change in amount of tracers of the tracer type detected during collection of the timeseries of aerosol data.

In the preceding example, during a test period succeeding the initial time period, the system can: trigger release of a tracer test load—including an aerosolized tracers of a first type—into ambient air in the aerosol zone, according to a set of release parameters, by a dispenser within the aerosol zone; and record a timeseries of aerosol data (e.g., a timeseries of aerosol amounts)—representing amounts of aerosolized particles in ambient air ingested by the air sampler during the test period—via a set of sensors 122 integrated into an air sampler arranged within the aerosol zone. Then, in response to completion of the test period, the system can: access the signal-processing model derived for the aerosol zone; input the set of release parameters and the timeseries of aerosol data into the signal-processing model; and return a tracer signal—such as a tracer "curve" (e.g., a decay curve) represented by a logarithmic function—output by the signal-processing model.

5.1.5.2 Different Tracer Types

In one implementation, the system can derive a single tracer signal for all tracers in a tracer test load based on total amount of tracers in the tracer test load and detected in the aerosol sample.

Alternatively, in another implementation, the system can derive a unique tracer signal for each tracer type, in a set of tracer types (e.g., size, reactivity, a class), present in the tracer test load. In particular, the system can leverage similarities between tracers and pathogens (e.g., bacteria, viruses) to mimic flow or dispersion of specific pathogens and/or groups of pathogens (e.g., of a particular pathogen type) within the aerosol zone. The system can then derive tracer signals for different tracer types—linked to different pathogens and/or pathogen types—released in the aerosol zone. For example, the air sampler can be configured to record timeseries aerosol data for tracers of different sizes.

The system can then derive tracer signals specific to different tracer sizes which correspond different pathogen sizes. In particular, in one example, the air sampler can: collect a first timeseries of aerosol data for tracers in a first size range; and collect a second timeseries of aerosol data for tracers in a second size range. The system can then implement the methods described above to derive: a first tracer signal—representing decay in amount of tracers in the first size range detected at the air sampler over time—based on the first timeseries of aerosol data; and a second tracer signal—representing decay in amount of tracers in the second size range detected at the air sampler over time—based on the second timeseries of aerosol data. The system can then leverage these first and second tracer signals to interpret aerosol metrics—for tracers in both the first size range and the second size range—in the aerosol zone.

5.1.5 Aerosol Flow Metrics

Block S140 of the method S100 recites: based on characteristics of the first tracer signal and the first concentration, predicting a set of aerosol flow metrics (e.g., air-change rate) for aerosolized particles of the first type in the aerosol zone.

In one implementation, the system can leverage one or more aerosol flow models to derive the set of aerosol flow metrics for the aerosol zone, based on tracer signals derived in the aerosol zone. In particular, in one example, the system can: trigger recording of a first timeseries of aerosol data via the set of sensors 122 integrated into the air sampler over a duration of a test period; and trigger release of a tracer test load into ambient air in the aerosol zone—over a dispense period within a test period—according to a first set of release parameters including an initial dispense time corresponding to a start of the dispense period, a duration of the dispense period, and/or a dispensation rate representing a rate of release of aerosolized tracers from the dispenser during the test period. Then, the system can: implement methods described above to derive a tracer signal—representing change in amount of tracers of the tracer type over a particular sampling window within the test period—from the first timeseries of aerosol data; access an air-change model linking characteristics of tracer signals, generated by tracers of the tracer type, to air-change rates for tracers of the tracer type in the aerosol zone; and predict a first air-change rate for tracers of the first type, in the aerosol zone, during the test period.

For example, the system can: derive a decay curve (e.g., an exponential decay curve) for tracers of the first tracer type in the aerosol zone based on the first timeseries of aerosol data, as described above; implement a log-linear model to estimate a series of decay rates—such as a first decay rate during a first sampling period (e.g., a 1-second period, 5-second period, 15-second period), within the sampling window, a second decay rate during a second sampling period within the sampling window, a third decay rate during a third sampling period within the sampling window, etc.—from the decay curve; access a first air-change model linking decay rates of decay curves (i.e., tracer signals) to air-change rates of tracers of the tracer type in the aerosol zone; and, based on the first air-change model and the series of decay rates, predict a first air-change rate for aerosols of the tracer type in the aerosol zone.

In this example, in response to the first air-change rate falling below a threshold rate defined for the aerosol zone, the system can: generate a notification indicating the first air-change rate and a prompt to implement a mitigation action (or "intervention"), in a set of mitigation actions, configured to increase the first air-change rate in the aerosol zone; and transmit the notification to a user affiliated with the aerosol zone. The system can therefore serve notifications or prompts to users affiliated with the aerosol zone based on results of the tracer test, such as via a user computing device accessed by a user and/or via a display integrated into the dispenser or air sampler.

5.2 Aerosol Zone: One Dispenser+Multiple Air Samplers

In one implementation, the aerosol detection system 100 can include a dispenser and an array of air samplers transiently deployed in a particular aerosol zone (e.g., within a facility). The computer system can then cooperate with the dispenser and the array of air samplers to: execute a tracer test in this particular aerosol zone during a test period, such as by triggering release of a tracer test load—including aerosolized tracers—by the dispenser and triggering each air sampler, in the array of air samplers, to capture timeseries aerosol data via the set of sensors 122 of each air sampler; derive a set of tracer signals—representing change in particle amounts detected at each air sampler during execution of the tracer test—based on timeseries aerosol data; and predict a set of aerosol flow metrics—representative of aerosol behaviors in the aerosol zone—based on characteristics of the detected tracer signal.

In this implementation, the system—such as the computer system interfacing with the dispenser 110 and the air sampler 120—can implement the methods and techniques described above to: enable deployment—such as by an operator affiliated with aerosol zone—of the dispenser and the array of air samplers within the aerosol zone; execute tracer tests within the aerosol zone; derive tracer signals from timeseries aerosol data collected by air samplers in the array of air samplers; and predict a set of aerosol flow metrics for aerosols in the aerosol zone based on these tracer signals.

5.2.1 System Setup: Array of Air Samplers

In one implementation, the aerosol detection system 100 can include: a dispenser arranged in a dispenser location within the aerosol zone; and a set of air samplers arranged about the dispenser in a target configuration within the aerosol zone.

For example, the set of air samplers can include: a first air sampler arranged in a first sampler location defining a first distance—falling within a target distance range—from the dispenser location; a second air sampler arranged in a second sampler location defining a second distance—falling within the target distance range—from the dispenser location; and a third air sampler arranged in a third sampler location—falling within the target distance range—defining a third distance from the dispenser location. Further, the set of air samplers can be arranged in a target pattern, such that each air sampler, in the set of air samplers, is approximately (e.g., within 1 percent, within 5 percent, within 20 percent) equidistant from both the dispenser and each other air sampler, in the set of air samplers. Therefore, in this example, the set of air samplers can be arranged in a target configuration defining both: a target pattern (e.g., a triangular pattern) for arrangement of the set of air samplers; and a target distance range of distances between each air sampler and the dispenser. In another example, the set of air samplers can further include a fourth air sampler arranged in a fourth sampler location defining a fourth distance—falling within the target distance range—from the dispenser location. In this example, the set of air samplers can be arranged in the target pattern—defining a square pattern—about the dispenser.

In this implementation, by including a set of air samplers arranged about the dispenser in the target configuration (e.g., equidistant from the dispenser), the system can enable collection of timeseries aerosol data at many locations in the aerosol zone, thereby: enabling prediction of tracer signals and aerosol flow metrics at a higher confidence; and minimizing instances of reduced detectability and/or low signal-to-noise aerosol data, such as due to unknown, unpredictable, or changing air flow patterns in the aerosol zone. In particular, by thus collecting aerosol data at multiple locations in the aerosol zone, the system can increase a likelihood of detection of aerosolized tracers—released by the dispenser—by a subset of air samplers in the set of air samplers.

5.2.2 Tracer Signal Analysis

In response to completion of a tracer test, during a test period, in the aerosol zone, the system can: access timeseries of aerosol data collected by the set of air samplers during the test period; and derive a set of tracer signals based on these timeseries of aerosol data.

In one implementation, the system can calculate a composite tracer signal for the aerosol zone based on a set of tracer signals derived from timeseries aerosol data collected at each air sampler in the set of air samplers. For example, the system can: access a first timeseries of aerosol data collected by a first air sampler, in the set of air samplers, during the test period; access a second timeseries of aerosol data collected by a second air sampler, in the set of air samplers, during the test period; derive a first tracer signal—representing change in amounts of aerosol particles detected at the first air sampler during the test period—based on the first timeseries of aerosol data; derive a second tracer signal—representing change in amounts of aerosol particles detected at the second air sampler during the test period—based on the second timeseries of aerosol data; and interpret a composite tracer signal for aerosols in the aerosol zone based on the first and second tracer signal.

Further, in another implementation, the system can leverage differences in tracer signals between air samplers to derive insights related to airflow pathways within the aerosol zone. For example, the system can: derive a first tracer signal—representing change in amounts of aerosol particles detected at a first air sampler during a test period—based on a first timeseries of aerosol data; derive a second tracer signal—representing change in amounts of aerosol particles detected at a second air sampler during the test period—based on a second timeseries of aerosol; and derive a third tracer signal—representing change in amounts of aerosol particles detected at a third air sampler during the test period—based on a third timeseries of aerosol data collected by the third air sampler during the test period. The system can then: extract a first maximum tracer amount—recorded at a first time—from the first tracer signal; extract a second maximum tracer amount—recorded at a second time—from the second tracer signal; and extract a third maximum tracer amount—recorded at a third time—from the third tracer signal. Based on a temporal order of the first, second, and third times, and the relative differences between the first, second, and third maximum tracer amounts, the system can predict a set of air flow pathways within the aerosol zone.

In particular, in one example, the system can: calculate a first difference between the first maximum tracer amount recorded at the first air sampler and the second maximum amount at the second air sampler; calculate a second difference between the first maximum tracer amount recorded at the first air sampler and the third maximum tracer amount recorded at the third air sampler; and calculate a third difference between the second maximum tracer amount recorded at the second air sampler and the third maximum tracer amount recorded at the third air sampler. The system can then leverage the first, second, and third differences to: predict a first airflow pathway of a first magnitude extending along a first vector intersecting a location of the dispenser and a location of the first air sampler in the aerosol zone; predict a second airflow pathway of a second magnitude extending along a second vector intersecting the location of the dispenser and a location of the second air sampler in the aerosol zone; and predict a third airflow pathway of a third magnitude extending along a third vector intersecting the location of the dispenser and a location of the third air sampler in the aerosol zone. The system can similarly predict additional airflow pathways extending between air samplers in the set of air samplers in order to derive an airflow profile for the aerosol zone, representing magnitude and directionality of air flow pathways within the aerosol zone.

5.3 Network of Dispensers

In one implementation, the aerosol detection system 100 can include multiple dispensers deployed throughout a facility. In particular, the aerosol detection system 100 can include: one or more air samplers deployed in the facility (e.g., an indoor environment); and a set of dispensers deployed in the facility, such as installed in various locations or aerosol zones (e.g., rooms, spaces) throughout the facility. In this implementation, the system can similarly leverage detection of tracers—dispensed by one or more dispensers in the network of dispensers—at one or more air samplers deployed throughout the facility to: collect timeseries aerosol data; interpret tracer signals based on timeseries aerosol data and release parameters defined for tracer test loads dispensed in the facility; derive aerosol flow metrics—representing flow of aerosols in a particular aerosol zone, between aerosol zone, and/or throughout the facility; characterize risk in one or more aerosol zones within the facility based on the aerosol flow metrics; and transmit notifications and/or prompts to a user or group of users affiliated with the facility based on interpret risk and/or aerosol flow metrics.

In one implementation, each dispenser, in the set of dispensers, can include: a dispenser communication module 114 configured to receive instructions for release of tracer test loads from the controller and/or computer system; a dispenser reservoir 112 (e.g., a cartridge) containing tracers (e.g., salt, fluorescent material, genetic material) in solution; and an actuator 116 configured to transiently release tracer test loads—including tracers in solution received from the dispenser reservoir 112—into the facility, such as via an aerosolizer or nebulizer integrated in the dispenser. The air sampler can include: a sampler communication module configured to receive instructions for initiating sampling periods from the controller and/or computer system; and a set of sensors 122 configured to track an amount (e.g., a quantity, a concentration) of tracers present in air flowing over the set of sensors 122. In this implementation, the computer system and/or controller can then selectively trigger the set of dispensers to release tracer test loads according to a dispense schedule defined for the set of dispensers. The system can then characterize aerosol behavior throughout the facility—and at each location or region at which a dispenser, in the set of dispensers, is deployed—based on linking of tracers detected at the air sampler to a particular dispenser, in the set of dispensers, installed in a particular location or region within the facility.

For example, the aerosol detection system 100 can include: an air sampler—including a sampler communication module and a set of sensors 122 configured to track a quantity of aerosol particles present in air flowing over the set of sensors 122—mounted to a wall within a first room of a facility; a first dispenser—including a first dispenser communication module 114 and configured to dispense tracer test loads including known quantities of salt particles—installed within a second room of the facility; and a second dispenser—including a second dispenser communication module 114 and configured to dispense tracer test loads including known quantities of salt particles—installed within a third room of the facility.

At a first time, the controller 126 can trigger the first dispenser to initiate a first tracer release, according to a first set of release parameters, over a first dispense period. In particular, the first dispenser can execute the first tracer release according to the first set of release parameters defining: a first test duration of the first dispense period; a first frequency of tracer doses, in a first series of tracer doses, dispensed during the first dispense period; a first quantity of tracer doses in the first series of tracer doses (e.g., based on the first frequency and the first test duration); a first dose duration of each tracer dose in the series of tracer doses; and a first dispensed amount of salt particles present in each tracer dose in the first series of tracer doses. Based on the first set of release parameters, the system can calculate a first target signal—generated by the first tracer release—configured to enable identification of salt particles dispensed by the first dispenser, during the first dispense period, detected by the air sampler.

Additionally, at a second time offset the first time—such as succeeding the first time by one minute, five minutes, one hour, etc.—the controller 126 can trigger the second dispenser to initiate a second tracer release, according to a second set of release parameters, over a second dispense period. In particular, the second dispenser can execute the second tracer release according to the second set of release parameters defining: a second test duration of the second dispense period; a second frequency of tracer doses, in a second series of tracer doses, dispensed during the second dispense period; a second quantity of tracer doses in the second series of tracer doses (e.g., based on the second frequency and the second test duration); a second dose duration of each tracer dose in the second series of tracer doses; and a second dispensed amount of salt particles present in each tracer dose in the second series of tracer doses. Based on the second set of release parameters, the system can calculate a second target signal—generated by the second tracer release and distinct from the first target signal—configured to enable identification of salt particles dispensed by the second dispenser, during the second dispense period, detected by the air sampler.

Further, in the preceding example, at approximately the first time, the controller 126 can trigger activation of the set of sensors 122 at the air sampler over a sampling period—including and/or extending beyond the first dispense period and the second dispense period—of a target duration. The set of sensors 122 can therefore track a quantity of particles (e.g., aerosol particles) present in air flowing over the set of sensors 122 during and/or succeeding execution of the first and second tracer releases. In particular, the set of sensors 122 can record a timeseries of particle quantities representing amounts of aerosol particles present in air flowing over the set of sensors 122 during the sampling period. The controller 126 and/or computer system can then leverage the first and second target signals—defined for the first and second tracer releases—to identify: a first subset of the timeseries of particle quantities corresponding to salt particles of the first tracer release dispensed by the first dispenser in the first room; and a second subset of the timeseries of salt quantities corresponding to salt particles of the second tracer release dispensed by the second dispenser in the second room.

In particular, in this example, the controller and/or computer system can: access the timeseries of particle quantities; identify a first subset of the timeseries of particle quantities corresponding to a first peak (e.g., a first maximum particle quantity) in particle quantity in the timeseries of particle quantities; and, based on a correlation between the first subset of the timeseries of particle quantities and the first target signal—such as based on a first amplitude of the first peak, a first period of the first peak, and/or a first shape of the first peak—link the first subset of the timeseries of particle quantities to the first tracer release by the first dispenser during the first dispense period. Similarly, the controller and/or computer system can: identify a second subset of the timeseries of particle quantities corresponding to a second peak (e.g., a second maximum particle quantity) in particle quantity in the timeseries of particle quantities; and based on a second correlation between the second subset of the timeseries of particle quantities and the second target signal—such as based on a second amplitude of the second peak, a second period of the second peak, and/or a second shape of the second peak—link the second subset of the timeseries of particle quantities to the second tracer release by the second dispenser during the second dispense period. The system can repeat this process to attribute additional peaks and/or subsets of the timeseries of particle quantities to a particular tracer release by a particular dispenser in the set of dispensers.

Further, in the preceding example, the system can leverage identification of tracers dispensed by the first dispenser, installed in the first room, and the second dispenser, installed in the second room, to derive insights related to aerosol behaviors throughout the facility. For example, for the first tracer release, the system can leverage the first subset of salt quantities to estimate: a first average duration between the first dispense time and a first detect time corresponding to initial detection of salt particles dispensed by the first dispenser; a first average velocity of aerosol particles flowing from the second room to the first room; a first average proportion of aerosol particles detected in the first room and dispensed (and/or initiating) in the second room; a first air change rate in the second room based on a rate of decay of the first subset of salt quantities; etc. Similarly, for the second tracer release, the system can leverage the second subset of salt quantities to estimate: a second average duration between the second dispense time and a second detect time corresponding to initial detection of salt particles dispensed by the second dispenser; a second average velocity of aerosol particles flowing from the third room to the first room; a second average proportion of aerosol particles detected in the first room and dispensed (and/or initiating) in the third room; a second air change rate in the third room based on a rate of decay of the second subset of salt quantities; etc.

5.3.1 Modulated Tracer Signal Identification

In the preceding implementation, the system can leverage identification of tracers output by the dispenser during a particular dispense period and detected at the air sampler to derive a set of aerosol flow metrics representing flow, movement, detectability, and/or other behaviors of aerosols in the space. In particular, the system can leverage identification of a tracer signal—defined for a particular tracer test load released by the dispenser and encoded in aerosol data recorded by the set of sensors 122—to link aerosol particles detected at the air sampler to tracers contained in the particular tracer test load, released by a particular dispenser, during the particular dispense period.

In particular, in this implementation, the system can schedule a tracer release—corresponding to dispensation of a series of tracer doses of a particular tracer test load—containing a known quantity of tracers (e.g., salt) in solution—over a dispense period. The system can define a set of release parameters for the tracer release, such as: a dispense time (e.g., a timestamp, a time period) corresponding to initiation of the dispense period; a total duration of the dispense period; a target frequency for dispensing each tracer dose, in the series of tracer doses, during the dispense period; an amount of the tracer test load—including a known amount of tracers (e.g., salt) in solution—released in each tracer dose; and/or a duration of each tracer dose in the series of tracer doses.

The system can then characterize a tracer signal—such as represented by a waveform (e.g., a geometric waveform, a periodic waveform, a symmetric waveform, a non-symmetric waveform) defining a particular period, amplitude, and/or shape—corresponding to this scheduled tracer release based on the set of release parameters. For example, the system can: calculate a target period for a waveform based on the target frequency and/or duration of each tracer dose; calculate a target amplitude (e.g., a maximum amplitude) for the waveform based on the amount of tracers contained in each tracer dose and/or the duration of each tracer dose; characterize a target shape and/or type of the waveform (e.g., square wave, rectangular wave, sine wave) based on the set of release parameters; and derive a target waveform (i.e., a target signal) representative of the tracer release based on the target period, the target amplitude, and the target shape. The system can therefore execute the tracer release according to this target waveform in order to generate a tracer signal detectable at the air sampler.

The system can thus leverage execution of the tracer release—according to this target waveform—to generate a detectable signal linking detection of tracers at the air sampler to this particular tracer release. In particular, in the preceding implementation, the system can trigger activation of the air sampler during a sampling period corresponding to (e.g., concurrent, immediately preceding and/or succeeding) the dispense period. During the sampling period, the set of sensors 122 can record a timeseries of aerosol data representing timestamped amounts of aerosol particles present in air flowing over the set of sensors 122.

The system can then leverage the target waveform in combination with this timeseries of aerosol data—representing changes in amounts of aerosol particles detected at the air sampler over a duration of the sampling period—to link aerosols detected at the air sampler with tracers dispensed by the dispenser during the dispense period for the tracer release. In particular, based on a correlation between the timeseries of aerosol data and the target waveform defined for the tracer release, the system can associate aerosol particles detected at the air sampler to a particular tracer dose, in the series of tracer doses, released by the dispenser at a particular time during the dispense period.

For example, the controller and/or computer system can: access a timeseries of amounts of aerosol particles recorded by the set of sensors 122 during the sampling period; extract a detected waveform—defining a particular period, amplitude, and/or shape—from the timeseries of amounts; characterize a correlation between the target waveform and the detected waveform; and, in response to the correlation exceeding a threshold correlation, associate discrete regions (e.g., each peak) of the detected waveform with a particular tracer dose, in the series of tracer doses, dispensed during the scheduled tracer release.

For example, the aerosol detection system 100 can include: a dispenser installed at a first location within a facility; and an air sampler installed at a second location in the facility. In this example, the system can schedule a tracer release at the dispenser during a defined dispense period. In particular, the system can define a set of release parameters for the tracer release including: a first dispense time corresponding to a start of the dispense period; a target duration (e.g., 30 seconds, one minute, ten minutes, one hour) of the dispense period; a frequency of release for each tracer dose, in a series of tracer doses, dispensed during the dispense period; an amount of tracers present in each tracer dose, in the series of tracer doses, dispensed during the dispense period; and a total amount of tracers released by the dispenser during the dispense period. Based on the set of release parameters, the system can calculate a target waveform—defining a target period, a target amplitude, and a target shape (e.g., square wave, sine wave, nonsymmetric wave) for the tracer release. The dispenser can then execute the tracer release according to the set of release parameters to generate a detectable signal—represented by the target waveform—linked to this particular tracer release from this dispenser at the first location.

Further, in the preceding example, at approximately the first dispense time, the system can trigger the set of sensors 122 to record a timeseries of aerosol data representing change in presence (e.g., magnitude) of aerosol particles at the set of sensors 122 over a sampling period.

In this implementation, the system can then leverage detection of tracers (e.g., at the air sampler)—released in a known quantity by a dispenser at a particular time and a particular location—to characterize aerosol behavior in the particular (indoor) space or facility. For example, the system can interpret a set of aerosol flow metrics for the space, such as: an average duration of time between release and detection of tracers; an average duration of time between initial detection of tracers originating from a particular tracer release and final detection tracers originating from the particular tracer release; a proportion of tracers detected at the air sampler from a particular tracer release; and/or a velocity of aerosol flow between the dispenser and the air sampler. The system can then store this set of aerosol flow metrics in an aerosol behavior profile for the space and/or facility.

5.3.2 Aerosol Flow Map

In one implementation, the system can characterize a set of aerosol flow pathways for the space based on timeseries aerosol data collected in the space. The system can then store this set of aerosol flow pathways in an aerosol flow profile representative of aerosol behavior throughout a particular facility or space.

In one implementation, the system can leverage spatial information provided for the space to derive an aerosol flow map representing flow—such as characterized by direction, distance, and/or duration (e.g., from release to detection at a particular location)—of aerosol particles in the space. In particular, the system can: access a set of images (e.g., LiDAR-scanned images) of interior spaces within a facility and captured by an optical sensor (e.g., a LiDAR sensor); and initialize a facility map—defining a 3D representation of interior spaces within the facility—based on the set of images. The system can then overlay this facility map with air flow information (e.g., air flow rates, direction and/or speed of air currents) derived for this facility from tracer and/or pathogen data collected in this facility to derive an aerosol flow map specific to this particular facility.

For example, during a calibration period, the system can: access a feed of images—including 360-degree LiDAR-scanned images of a set of spaces (e.g., an office, a breakroom, a bathroom) within the facility—captured by a LiDAR sensor deployed to the facility during the calibration period; and derive a 3D map of the facility—including 3D representations of each space in the set of spaces in the facility—based on the feed of images collected during the calibration period.

The system can then overlay the 3D map of the facility with the set of air flow pathways—derived during one or more calibration periods—to generate a 3D aerosol flow map for this facility. The system can therefore leverage this 3D aerosol flow map to: confirm, modify, normalize, and/or generate aerosol flow models configured to predict flow of aerosols (e.g., pathogens, salt particles, tracers, fluorescent material) in the facility based on facility specifications (e.g., dimensions, barriers, door and/or window locations) and/or environmental characteristics (e.g., HVAC settings, human occupancy) of the facility; identify regions of high and/or low risk (e.g., pathogen transmission risk, pathogen exposure risk) in the facility based on air flow patterns in the facility and represented in 3D aerosol flow map; predict flow, dispersion, and/or spread of aerosols (e.g., tracers, pathogens) in this facility; and/or provide a visual representation of aerosol movements and/or flow patterns throughout the facility—rather than solely provide raw data, such as timeseries aerosol data and/or air flow metrics—to a user or users associated with the facility.

6. Environmental Controls

In one implementation, the system can access a set of environmental controls—such as HVAC settings, occupancy levels, activity levels or types, etc.—for the aerosol zone, such as before, during, and/or after execution of a tracer test within a test period. In this implementation, the system can leverage results of the tracer test—such as a set of aerosol metrics derived from timeseries aerosol data collected during execution of the tracer test—to: characterize effectiveness of current environmental controls in the aerosol zone; and/or suggest modifications to current environmental controls, such as to a manager affiliated with the aerosol zone.

For example, during execution of a tracer test within a test period, the system can record a first timeseries of environmental controls, for a first aerosol zone in a facility, such as: a first timeseries of occupancy levels (e.g., number of occupants, occupant density) in the first aerosol zone; a first timeseries of occupancy durations (e.g., duration spent by each occupant in the aerosol zone) in the first aerosol zone; a first timeseries of HVAC data (e.g., temperature, humidity, air filtration rate) in the first aerosol zone; and a first timeseries of intervention data (e.g., windows open or closed, time since last cleaning, type of chemical applied to surfaces). Then, based on timeseries aerosol data collected during execution of the tracer test, the system can interpret a set of aerosol metrics—representing flow and/or movement of aerosol in the aerosol zone during the test period—for the aerosol zone. Based on the set of aerosol metrics, the system can characterize effectiveness (e.g., a percentage, a score out of 100, "highly-effective", "effective", "ineffective", or "detrimental") of the current set of environmental controls—represented in the first timeseries of environmental controls—implemented in the aerosol zone.

Further, in the preceding example, in response to a particular aerosol metric, in the set of aerosol metrics, falling outside of a threshold deviation of a target metric (e.g., defined for the aerosol metric), the system can: generate a notification indicating the particular aerosol metric and including a prompt to modify the HVAC settings—such as according to a particular set of HVAC settings—predicted to drive the particular aerosol metric toward the target metric.

In one variation, the system can automatically implement modifications to the set of environmental controls in the aerosol zone based on current aerosol metrics and/or risk—associated with a set of pathogens—in the aerosol zone. In particular, in one example, during execution of a tracer test within a test period, the system can access a first set of HVAC settings currently employed by an HVAC system of the aerosol zone. Then, based on timeseries aerosol data collected during execution of the tracer test, the system can interpret a set of aerosol metrics—including a first air-change rate—for the aerosol zone. In response to the first air-change rate falling below a threshold air-change rate defined for the aerosol zone, the system can: select a second set of HVAC settings, in replacement of the first set of HVAC settings, predicted to increase air-change rate in the aerosol zone; and trigger the HVAC system to adjust HVAC settings according to the second set of HVAC settings. Additionally, in this example, the system can execute an additional tracer test—such as after a threshold duration of receiving confirmation of implementation of the second set of HVAC settings by the HVAC system—during a subsequent test period, to verify increase of the air-change rate in the aerosol zone. The system can continue to trigger adjustment of the HVAC settings in the aerosol zone until the air-change rate exceeds the threshold air-change rate defined for the aerosol zone.

6.1 Calibration Model: Environmental Controls

In one implementation, the system can execute multiple calibration periods to construct a calibration model—configured to predict a set of aerosol metrics in the aerosol zone—for a particular aerosol zone as a function of environmental controls (e.g., environmental conditions) within the aerosol zone. In particular, the system can access environmental data (e.g., HVAC settings, air temperature, humidity, time of day, indoor air velocity, human occupancy, occupancy duration) recorded during execution of one or more tracer tests (e.g., release of tracer test loads) during test or "calibration" periods to derive correlations between aerosol flow metrics in the aerosol zone and environmental controls within the aerosol zone.

For example, during each test period, in a set of test periods for an aerosol zone, the system can: trigger recording of timeseries aerosol data at the air sampler; trigger release of a tracer test load by the dispenser; and access a set of environmental data—such as an average air temperature, an average humidity level, a time of day, an average indoor air velocity, an average human occupancy, an average occupancy duration (e.g., an average duration of time spent in the space by human occupants)—corresponding to the aerosol zone during the calibration period. Then, for each test period, in the set of test periods, the system can: derive a tracer signal from the timeseries aerosol data collected during the test period; predict a set of aerosol flow metrics—such as an air-change rate, an airflow velocity, an aerosol reduction rate, a direction of airflow, etc.—based on characteristics of the tracer signal; and associate the set of aerosol flow metrics with the set of environmental data collected during the corresponding test period. The system can then compile each set of aerosol flow metrics and the corresponding set of environmental data—such as for each tracer test executed during the set of test periods—into a calibration model for this aerosol zone defining aerosol metrics as a function of environmental controls in this aerosol zone.

The system can therefore derive a calibration model representing a set of aerosol metrics—representative of aerosol movement and/or behaviors, such as an air-change rate, a clearance rate, an exposure reduction rate, etc.—in the aerosol zone as a function of environmental controls in this aerosol zone. The system can then leverage this calibration model to predict real-time aerosol metrics—(e.g., movement patterns and/or behaviors) in the aerosol zone based on current environmental controls in this aerosol zone.

7. Tracking Aerosol Flow Metrics Over Time

In one implementation, the system can: track changes in aerosol flow metrics within the aerosol zone over time; and predict a causal pathway associated with changes in aerosol flow metrics derived for the aerosol zone.

In particular, in this implementation, the system can: predict a first set of aerosol flow metrics for the aerosol zone during a first test period based on timeseries aerosol data collected during the first test period, as described above; predict a second set of aerosol flow metrics for the aerosol zone during a second test period, succeeding the first test period, based on timeseries aerosol data collected during the second test period; characterize a difference between the first set of aerosol flow metrics and the second set of aerosol flow metrics; and, based on the difference, predict a causal pathway—such as a change in a particular ventilation technique, in a set of ventilation techniques, employed in the aerosol zone—associated with difference.

For example, during a first test period, the system can: access a first timeseries of aerosol data collected by a first air sampler arranged in the aerosol zone; access a first set of release parameters corresponding to dispensation of a first test tracer load, during the test period, by a dispenser arranged in the aerosol zone; derive a first tracer signal, representing changes in amounts of tracers of a first type in air detected at the first air sampler during the first test period, based on the first timeseries of aerosol data and the first set of release parameters; and, based on characteristics of the first tracer signal, predict a first air-change rate for aerosolized particles of the first type in the aerosol zone during the first test period. Then, during a second test period succeeding the first test period, the system can: access a second timeseries of aerosol data collected by the first air sampler; access a second set of release parameters corresponding to dispensation of a second test tracer load, during the second test period, by the dispenser; derive a second tracer signal, representing changes in amounts of tracers of the first type in air detected at the first air sampler during the second test period, based on the second timeseries of aerosol data and the second set of release parameters; and, based on characteristics of the second tracer signal, predict a second air-change rate for aerosolized particles of the first type in the aerosol zone during the second test period. The system can then: characterize a difference between the first and second air-change rates; and, in response to the difference exceeding a threshold difference, predict a first causal pathway—such as a change in HVAC settings within the aerosol zone.

In this implementation, the system can: generate notifications indicating detected changes in aerosol flow metrics (e.g., an air-change rate) in the aerosol zone; and transmit these notifications to a user or users affiliated with the aerosol zone. For example, in the preceding example, in response to the difference exceeding the threshold difference, the system can: generate a notification—including a prompt to verify or modify the HVAC settings within the aerosol zone—indicating the difference between the first and second air-change rate; and transmit the notification to user affiliated with the aerosol zone.

8. Risk

In one implementation, the system can characterize risk—such as exposure risk and/or infection risk for a particular pathogen or set of pathogens—in various locations or aerosol zones within the facility. In particular, the system can leverage known characteristics of the space in combination with a set of aerosol flow metrics—such as contained in an aerosol behavior profile generated for the aerosol zone or facility—derived for one or more aerosol zones in the facility based on detection of tracers released by one or more dispensers installed in the aerosol zone and detected at one or more air samplers installed in the aerosol zone—to characterize risk associated with a particular pathogen, a group of pathogens, or a type of pathogen in the aerosol zone.

For example, the system can access a set of zone parameters defined for an aerosol zone, such as: a size of the space; a quantity of discrete spaces (e.g., divided rooms) within the facility; a quantity of windows and/or doorways in the space; a location of each window and/or doorway in the space; an average occupancy; average or daily HVAC settings; a location of the facility; a local, regional, or global transmission rate and/or exposure rate associated with a particular pathogen or set of pathogens; etc. The system can then execute one or more calibration periods, as described above, to derive an aerosol behavior profile for the facility, specifying: a set of aerosol flow pathways—including direction and/or velocity of air flow—throughout the facility; an aerosol clearance rate for each discrete space within the facility; an exposure reduction rate for each discrete space within the facility; an air change rate within a particular defined space (i.e., aerosol zone); an air exchange rate between adjacent discrete spaces within the facility; etc. The system can then access a risk model (e.g., a transmission risk model and/or an exposure risk model) configured to link characteristics of the space in combination with specific aerosol behaviors exhibited in this space—represented in the aerosol behavior profile—to risk associated with pathogen exposure and/or transmission in a particular space or spaces within the facility. Therefore, based on the risk model, the aerosol behavior profile, and the set of defined characteristics of the facility, the system can estimate: a first risk score for a first discrete space—such as a first room or a first group of rooms—within the facility; a second risk score for a second discrete space—such as a second room or a second group of rooms—within the facility; a third risk score for a third discrete space—such as a third room or a third group of rooms—within the facility; etc.

The system can thus: characterize risk in the space—such as represented by a set of risk scores—based on the aerosol behavior profile derived for the space; and report these risk scores to a user or users associated with the space.

In one example, the system can characterize risk in a particular aerosol zone based on a set of aerosol flow metrics derived during execution of a tracer test in the aerosol zone. In particular, in this example, the system can: trigger execution of a tracer test within the aerosol zone; derive a tracer signal—representing change in amounts of tracers detected at one or more air samplers within the aerosol zone during execution of the tracer test—from timeseries aerosol data collected during execution of the tracer test; characterize a set of aerosol flow metrics—including a first air-change rate—representing flow of aerosols in the aerosol zone; access a set of zone parameters defined for the aerosol zone, such as a size of the aerosol zone, a quantity of windows and/or doorways in the aerosol zone, a location of each window and/or doorway in the aerosol zone, an average occupancy, average or daily HVAC setting, a location of a facility containing the aerosol zone, etc.; access a risk model linking air-change rates for aerosolized particles (e.g., of a particular tracer type) in the aerosol zone to risk associated with a first set of pathogens (e.g., of a particular pathogen type corresponding to the tracer type) based on zone parameters defined for the aerosol zone; and, based on the set of zone parameters, the first air-change rate, the and the risk model, predict a current risk level—such as a transmission risk or an exposure risk—associated with the set of pathogens in the aerosol zone.

8.1 Risk Model

In one implementation, the system can derive a risk model, in set of risk models, for each aerosol zone linking dynamic zone parameters—such as environmental controls (e.g., human occupancy levels, duration of human occupancy, activity level), regional health data (e.g., prevalence of a particular pathogen in a region containing the aerosol zone), measured pathogen levels in the aerosol zone and/or surrounding aerosol zones, measured tracer levels in the aerosol zone (e.g., current detectability of tracers)—to risk level for a set of pathogens in the aerosol zone. The system can then characterize risk (e.g., risk of transmission per infected person, risk of individual infection, risk of exposure) in a particular aerosol zone—such as for a set of pathogens, a particular pathogen type, and/or a particular pathogen—based on these dynamic zone parameters and a risk model derived for the aerosol zone.

In one implementation, the system can: access a generic, pre-defined risk model linking environmental controls (e.g., human occupancy levels, duration of human occupancy) to risk (e.g., risk of transmission per infected person, risk of individual infection, risk of exposure) associated with a set of pathogens in an aerosol zone, based on a fixed set of characteristics of the aerosol zone, such as: a floor area; a ceiling height; a ventilation rate; an air filtration rating; etc. For example, the generic, pre-defined risk model can be configured to: intake a fixed set of characteristics of the aerosol zone including a size (e.g., area, volume) of the aerosol zone, a ventilation rate (e.g., controlled by an HVAC system), and an air filtration rating; calculate an estimated aerosol clearance rate in the aerosol zone based on the fixed set of characteristics and a generic clearance rate model; intake a set of environmental controls for the aerosol zone; and output a risk level for a pathogen, in a set of pathogens, in the aerosol zone based on the set of environmental controls and the estimated aerosol clearance rate.

The system can then modify, mask, or customize this generic, pre-defined risk model based on collected aerosol data representing detectability, flow, and/or other behaviors or aerosols in this particular aerosol zone—such as aerosol clearance rate and/or exposure reduction rate in this aerosol zone (e.g., as a function of environmental controls, regional health data, measured pathogen levels, and/or measured tracer levels in the aerosol zone)—to derive a zone-specific risk model for this aerosol zone.

The zone-specific risk model can therefore be configured to: intake an aerosol clearance rate (or aerosol clearance rate model) derived from aerosol data associated with the aerosol zone; intake a set of zone parameters—including environmental controls, regional health data, and/or detected pathogen and/or tracer levels—and output a risk level for a pathogen, in a set of pathogens, in the aerosol zone based on the set of zone parameters and the aerosol clearance rate.

The system can thus leverage aerosol data collected from the aerosol zone (e.g., during and/or after a set of calibration periods) to more accurately predict behaviors (e.g., direction and velocity of movement, air-change rate, clearance rate, exposure reduction rate) of aerosols in particular aerosol zones, and therefore more accurately interpret risk associated with various pathogens in these particular aerosol zones. The system can leverage these zone-specific risk models to: track risk associated with a set of pathogens across each aerosol zone within a facility; alert a user or users associated with the facility of current risk levels throughout the facility; suggest target parameters (e.g., maximum occupancy, maximum activity levels) within the aerosol zone configured to minimize risk and/or maintain risk below a threshold risk; and/or inform tracer release and/or pathogen sampling in aerosol zones within the facility based on interpreted risk levels in these aerosol zones.

Additionally, in one implementation, in which the aerosol detection system 100 includes a set of dispensers and a set of air samplers deployed throughout multiple aerosol zones within a facility, the system can: characterize risk levels in each defined aerosol zone within the facility over time— such as continuously, at a fixed frequency (e.g., once per minute, once per hour, once per day), and/or selectively based on defined triggers (e.g., environmental triggers) in these spaces—for a set of pathogens specified for these spaces; and alert a user (e.g., via a native application) associated with the facility if the risk level (e.g., in a particular space and/or for a particular pathogen) exceeds a threshold risk level defined for the space (e.g., by a manager of the facility). The system can thus execute Blocks of the method to assist a user (e.g., manager, and administrator, or operator) associated with the facility monitor and/or manage risk (e.g., risk of exposure, risk of transmission) associated with a set of pathogens in each aerosol zone defined space within the facility.

In one implementation, the system can estimate a current risk level of a particular aerosol zone based on current zone parameters (e.g., environmental controls, regional health data, detected pathogen and/or tracer levels) in the aerosol zone. In particular, the system can track a set of zone parameters for the particular aerosol zone; and leverage a risk model associated with this particular aerosol zone to interpret a risk level (e.g., for all pathogens, for a particular pathogen type, for a particular pathogen) based on the current (or most-recent) zone parameters for this particular aerosol zone. The system can be configured to estimate risk levels in an aerosol zone at a target frequency, such as once-per-minute, once-per-hour, once-per-day, once-per-week, etc. Further, the system can track zone parameters across a set of aerosol zones within a facility to interpret current risk levels in each aerosol zone, in the set of aerosol zones, in the facility. The system can then selectively alert a user (e.g., a manager, an administrator) associated with a particular aerosol zone or the facility based on the interpreted risk levels.

Additionally, the system can also suggest changes to environmental controls (e.g., human occupancy level, air filtration rate, air temperature, humidity, human activity level) and/or implementation of interventions (e.g., a cleaning protocol, a set of HVAC settings, modifications to layout of the space, ventilation techniques) configured to reduce risk (e.g., pathogen exposure risk, pathogen transmission risk) in the space.

8.1.1 Environmental Controls

As described in the preceding implementation, the system can leverage measured and/or recorded environmental controls in a particular aerosol zone to evaluate risk associated with a particular pathogen or pathogen type in the particular aerosol zone.

For example, during a first period, the system can record a first timeseries of environmental controls, for a first aerosol zone in a facility, including: a first timeseries of occupancy levels (e.g., number of occupants, occupant density) in the first aerosol zone; a first timeseries of occupancy durations (e.g., duration spent by each occupant in the aerosol zone) in the first aerosol zone; a first timeseries of HVAC data (e.g., temperature, humidity, air filtration rate) in the first aerosol zone; a first timeseries of intervention data (e.g., windows open or closed, time since last cleaning, type of chemical applied to surfaces). Then, upon expiration of the first period, the system can estimate a set of risk levels for the aerosol zone, each risk level in the set of risk levels associated with a particular pathogen type (e.g., pathogen size) and/or a particular pathogen in the aerosol zone, based on the first timeseries of environmental controls.

In particular, in this example, the system can: calculate a first risk level for a first pathogen, in a set of pathogens, in the aerosol zone, based on the first timeseries of environmental controls and a first risk model, in a set of risk models, derived for the first pathogen in the first aerosol zone; calculate a second risk level for a second pathogen, in the set of pathogens, in the aerosol zone, based on the first timeseries of environmental controls and a second risk model, in the set of risk models, derived for the second pathogen in the first aerosol zone.

8.1.2 Regional Health Data

Additionally, in one implementation, the system can leverage available, regional health data—such as prevalence (e.g., rate of transmission, percentage of population infected) of a pathogen and/or a particular strain of the pathogen in a region including the facility—to estimate risk level in a particular aerosol zone.

In particular, in the preceding example, the system can: calculate the first risk level for the first pathogen in the aerosol zone based on the first timeseries of environmental controls, a first transmission rate for the first pathogen in a geographical region containing the facility, and the first risk model; and calculate the second risk level for the second pathogen in the aerosol zone based on the first timeseries of environmental controls, a second transmission rate for the second pathogen in the geographical region, and the second risk model.

8.1.3 Detected Tracer Levels

The system can be configured to intermittently trigger output of tracer test loads, during a live period succeeding calibration, by the dispenser to: confirm detection of tracers in aerosol samples collected by the air sampler; and monitor changes to airflow patterns and/or aerosol behavior in an aerosol zone. The system can then leverage results of aerosol sample testing to: detect whether an air sampler is functioning properly; detect environmental changes in the space that may affect detectability of tracers and/or pathogens; and/or to update the calibration profile (e.g., including a set of calibration factors and/or a set of calibration curves or rates) for this aerosol zone.

In one example, the system can: trigger collection of an aerosol sample by the air sampler during a sampling window of a target duration within the live period; and trigger release of a tracer test load by the dispenser within the sampling window. Then, upon completion of genetic testing of the tracer test load, the system can access a detected tracer level of tracers in the aerosol sample. The system can also: access a true tracer level of tracers output by the dispenser in the tracer test load; access an aerosol clearance rate stored for the aerosol zone; estimate a predicted tracer level of tracers in the aerosol sample based on the true tracer level and the aerosol clearance rate; characterize a difference between the predicted tracer level and the detected tracer level of tracers in the aerosol sample; and confirm and/or update the aerosol clearance rate for the aerosol zone based on the difference. Further, the system can identify specific changes in environmental factors in the aerosol zone associated with the difference.

8.1.4 Variation: Detected Pathogen Levels

In one variation—in which the air sampler is configured to collect aerosol samples for pathogen testing—the system can also leverage detected pathogen levels (e.g., historical pathogen levels, pathogen levels recorded in a preceding period of time, current pathogen levels) in an aerosol zone and/or surrounding aerosol zones to characterize a current or future risk level in this zone.

For example, the system can access a set of zone parameters including: a current occupancy level in the first aerosol zone; a current temperature in the first aerosol zone; a current humidity level in the first aerosol zone; a current air filtration rate in the first aerosol zone; and a detected amount of the first pathogen in an aerosol sample collected in the first aerosol zone during a preceding sampling period; and/or detected amounts of the first pathogen in aerosol samples collected from surrounding aerosol zones. The system can then estimate the first risk level associated with the first pathogen in the first aerosol zone based on the set of zone parameters and a risk model associated with the first aerosol zone.

8.2 Target Environmental Controls

In one implementation, the system can suggest a set of target environmental controls for a particular aerosol zone based on aerosol data collected (e.g., during a calibration period) in this aerosol zone.

For example, the system can estimate a set of target environmental controls—such as a maximum occupancy, a maximum occupancy duration, a maximum activity level (e.g., associated with a maximum breathing rate), and/or a set of HVAC operating parameters—configured to maintain a risk level in an aerosol zone below a threshold risk level (e.g., defined for the aerosol zone). Further, the system can be configured to: estimate a set of target environmental controls for each aerosol zone, in a set of aerosol zones, in a facility at a target frequency, such as once-per-hour, once-per-day, or once-per-week; compile these target environmental controls into a catalog of target environmental controls, including a set of target environmental controls for each aerosol zone in the set of aerosol zones; and transmit this catalog of target environmental controls to a user—such as a manager, administrator, or operator—associated with the facility.

For example, at a first time preceding a first operating period, for a first aerosol zone, in a set of aerosol zones, in a facility, the system can: access a first risk model, in a set of risk models, associated with the first aerosol zone; access a first threshold risk level assigned to the first aerosol zone for the first operating period; access a first set of zone parameters—including environmental controls (e.g., a known activity level or type, an air filtration rate, an occupancy level), current pathogen levels in the first aerosol zone and/or facility, current tracer levels in the first aerosol zone defined for the first aerosol zone, and/or current regional health data—for the first operating period; and calculate a first set of target environmental controls based on the first risk model, the first threshold risk level, and the first set of controls.

Then, for a second aerosol zone, in the set of aerosol zones, the system can: access a second risk model, in the set of risk models, associated with the second aerosol zone; access a second threshold risk level assigned to the second aerosol zone for the first operating period; access a second set of zone parameters defined for the second aerosol zone for the first operating period; and calculate a second set of target environmental controls based on the second risk model, the second threshold risk level, and the second set of controls. The system can then: generate a first catalog of target environmental controls including the first and second set of target environmental controls; and transmit (e.g., via push notification, via native application, via email) the first catalog of target environmental controls to an operator associated with the facility, prior to a start of the first operating period.

The system can then repeat this process before each successive operating period to update the target environmental controls for each aerosol zone in the facility, such as based on changes in the aerosol zone that affect airflow in the aerosol zone, changes to the threshold risk level in the aerosol zone, changes to pathogen levels in the facility and/or in a region (e.g., a geographical region) containing the facility.

Further, the system can estimate a set of target environmental controls, for a particular aerosol zone, configured to maintain a risk level for a particular pathogen, a particular type of pathogen, and/or for all pathogens in the aerosol zone below the threshold risk level. For example, for an aerosol zone in a facility, the system can: access a first risk model, in a set of risk models, associated with a first pathogen type (e.g., a pathogen size, a pathogen identity) in the aerosol zone; access a first threshold risk level assigned to the first pathogen type in the aerosol zone; access a first set of zone parameters (e.g., current pathogen levels of pathogens of the first pathogen type in the facility and/or surrounding region, a known activity level or type) defined for the aerosol zone; and calculate a first set of target environmental controls based on the first risk model, the first threshold risk level, and the first set of zone parameters.

Further, the system can: access a second risk model, in the set of risk models, associated with a second pathogen in the aerosol zone; access a second threshold risk level assigned to the second pathogen type in the aerosol zone; access a second set of zone parameters (e.g., current pathogen levels of pathogens of the second pathogen type in the facility and/or surrounding region) defined for the aerosol zone; and calculate a second set of target environmental controls based on the second risk model, the second threshold risk level, and the second set of zone parameters.

The system can then generate a catalog of target environmental controls including both the first and second set of target environmental controls for the aerosol zone. Alternatively, the system can leverage the first and second set of target environmental controls, associated with pathogens of the first and second pathogen type in the aerosol zone, to derive a set of composite target environmental controls for the aerosol zone.

In particular, in this example, the system can: access the first set of target environmental controls, corresponding to pathogens of the first pathogen type in the aerosol zone, including a first maximum occupancy, a first maximum occupancy duration, and a first maximum activity level; and access the second set of target environmental controls, corresponding to pathogens of the second pathogen type in the aerosol zone, including a second maximum occupancy, a second maximum occupancy duration, and a second maximum activity level. Then, in response to the first maximum occupancy falling below the second maximum occupancy, the system can assign the first maximum occupancy as the target maximum occupancy for the aerosol zone.

Further, in response to the first maximum occupancy duration falling below the second maximum occupancy duration, the system can assign the first maximum occupancy duration as the target maximum occupancy duration for the aerosol zone. Finally, in response to the first maximum activity level exceeding the second maximum activity level, the system can assign the second maximum activity level as the maximum activity level in the aerosol zone. The system can then therefore derive a set of target environmental controls configured to maintain each risk level, for each pathogen type in the aerosol zone, below the threshold risk level defined for each pathogen in the aerosol zone.

9. Variation: Background Tracer Levels

In one variation, the system can leverage variations in background tracer levels—such as amounts of background tracers naturally present in ambient air absent release of a tracer test load by the dispenser—in the aerosol zone to derive tracer signals (e.g., an exponential decay curve) based on these variations in background tracer levels. In this variation, the system can implement methods and techniques described above to similarly: interpret aerosol metrics for the aerosol zone based on these tracer signals; characterize risk in the aerosol zone based on these aerosol metrics and/or environmental controls recorded in the aerosol zone; and/or transmit prompts to a user affiliated with the aerosol zone based on derived aerosol metrics and risk.

In particular, in this variation, the pathogen detection system 100 can include a set (e.g., one, two, four, ten) of air samplers—each including a set of sensors configured to detect tracers in ambient air ingested by the air sampler—located (e.g., transiently, semi-permanently, or permanently installed) in the aerosol zone. The system can then record timeseries aerosol data—representing change in amounts of tracers at each air sampler—and interpret tracer signals in this timeseries aerosol data, such as without releasing a tracer test load into ambient air in the aerosol zone. In this variation, the system can leverage changes in environmental controls in the aerosol zone—such as changes in occupancy, movement of occupants in the aerosol zone, opening or closing of doors or windows, modifications to HVAC settings, etc.—which may trigger deviations in aerosol flow from equilibrium, to naturally generate tracer signals detectable by one or more air samplers, in the set of air samplers. The system can thus detect time periods corresponding to these deviations from equilibrium—represented by deviation in amounts of background tracers from a baseline amount—and derive tracer signals from timeseries aerosol data collected during these time periods.

For example, during a test period of a target duration (e.g., one hour, four hours, 24 hours, 1 week), the system can record a timeseries of aerosol data via a set of sensors integrated into an air sampler, in the set of air samplers, in the aerosol zone. Based on the timeseries of aerosol data—in combination with historical aerosol data collected in the aerosol zone—the system can estimate a baseline tracer amount (e.g., an average tracer amount) of background tracers present in ambient air in the aerosol zone. Further, the system can: isolate a first sampling window, within the test period, corresponding to a decrease in amount of background tracers; and, based on characteristics (e.g., a shape of a decay curve, a rate of decay) of timeseries aerosol data collected during the first sampling window, interpret a first "background" tracer signal—such as a first decay curve representing decrease in amount of background tracers during the first sampling window—for the aerosol zone. The system can similarly interpret additional tracer signals within the timeseries of aerosol data by identifying sampling windows corresponding to time periods of decay in amount of background tracers. For example, the system can: isolate a second sampling window, within the test period, corresponding to a decrease in amount of background tracers; and, based on characteristics of timeseries aerosol data collected during the second sampling window, interpret a second "background" tracer signal for the aerosol zone. The system can thus derive a set of background tracer signals over a duration of the test period. Further, based on the set of background tracer signals, the system can derive a set of aerosol metrics for the aerosol zone during the test period, as described above.

In one implementation, the system can leverage a signal-processing model—as described above—to predict presence of a sampling window (e.g., a period of tracer decay) corresponding to a background tracer signal.

Generally, in this implementation, the system can: access a timeseries of aerosol data recorded by the air sampler during a test period; access a timeseries of environmental data—indicating changes in environmental control at particular times or time periods—recorded during the test period; link a first subset of time periods, in the test period, and corresponding aerosol data to periods of equilibrium (or "non-signaling periods") based on the timeseries of aerosol data and the timeseries of environmental data; link a second subset of time periods, in the test period, and corresponding aerosol data to periods of decay (or "signaling periods"); for each signaling period, derive a background tracer signal, in a set of background tracer signals, based on timeseries aerosol data, in the timeseries of aerosol data, collected during the signaling period; implement regression, artificial intelligence, machine learning, deep learning, and/or other techniques to derive links or correlations between the timeseries aerosol data and instances of tracer signals, in the set of tracer signals, in this aerosol zone; and therefore derive a signal-processing model—such as specific to the aerosol zone and/or a background tracer type—configured to accurately detect and characterize background tracer signals from timeseries aerosol data collected in the aerosol zone. Over time, the system can: collect additional timeseries aerosol data recorded in the aerosol zone; derive background tracer signals from these aerosol data; and further update the signal-processing model based on these aerosol data and derived background tracer signals.

10. Identifying Homogenous, Aerosol Zones

The system can leverage similarities in aerosol behaviors (e.g., exposure reduction rate, aerosol clearance rate) and/or detectability throughout different spaces within a facility—such as represented by calibration factors or curves (e.g., aerosol clearance rates, and/or exposure reduction rates) derived from aerosol data collected in this facility—to define a set of homogenous aerosol zones (hereinafter "aerosol zones") within the facility.

For example, in preparation for a calibration period for an office building, a set of dispensers and a set of air samplers can be deployed throughout various spaces in the office building. In particular, in this example, the system can include the set of dispensers including: a first dispenser installed in a common work area and configured to release tracers of a first type (e.g., linked to the first dispenser); a second dispenser installed in a conference room and configured to release tracers of a second type (e.g., linked to the second dispenser); and a third dispenser installed in a break room and configured to release tracers of a third type (e.g., linked to the third dispenser). The system can also include the set of air samplers including: a first air sampler installed in the common work area; a second air sampler installed in the conference room; and a third air sampler installed in the break room.

During the calibration period, the system can: trigger collection of a sequence of aerosol samples by each air sampler, in the set of air samplers, and collected at a target frequency; and trigger dispensation of a sequence of tracer test loads containing tracers by each dispenser, in the set of dispensers. The system can then: access a first timeseries of aerosol data derived from aerosol samples, in the sequence of aerosol samples, collected by the first air sampler; access a second timeseries of aerosol data derived from aerosol samples, in the sequence of aerosol samples, collected by the second air sampler; access a third timeseries of aerosol data derived from aerosol samples, in the sequence of aerosol samples, collected by the third air sampler. Then, the system can: derive a first calibration curve for the common work area—representing detectability and/or behaviors (e.g., flow patterns, aerosol clearance rates, exposure reduction rates) of aerosols in the common work area—based on the first timeseries of aerosol data; derive a second calibration curve for the conference room—representing detectability and/or behaviors of aerosols in the conference room—based on the second timeseries of aerosol data; and derive a third calibration curve for break room—representing detectability and/or behaviors of aerosols in the break room—based on the third timeseries of aerosol data.

The system can then compare each of these calibration curves to identify aerosol zones—exhibiting similar detectability and/or behaviors of aerosols (e.g., flow patterns, clearance rates, exposure reduction rates)—in the office building. In particular, in this example, the system can: characterize a first difference between the first calibration curve for the common work area and the second calibration curve for the conference room; and characterize a second difference between the first calibration curve for the common work area and the third calibration curve for the break room. Finally, in response to the first difference falling below a threshold difference and the second difference exceeding the threshold difference, the system can: identify a first aerosol zone, in a set of aerosol zones in the facility, including the common work area and the conference room; and identify a second aerosol zone, in the set of aerosol zones in the facility, including the break room.

11. Calibration

In one implementation, the air sampler is deployed in a particular space (e.g., a classroom, an office, a shop, an airport terminal) and configured to ingest air present in this particular space and to capture aerosol samples (e.g., air samples containing captured airborne pathogens) from air in this particular space. In this implementation, the molecular tracer dispenser is deployed in the particular space (e.g., permanently or exclusively during the calibration period) and is configured to release airborne tracer test loads (e.g., tracer test loads)—including known concentrations of tracers—into air in this particular space. During a calibration period for this particular space, the system can trigger collection of an aerosol sample at the air sampler and concurrently trigger release of a tracer test load from the molecular tracer dispenser. The system (or an external lab or sensor) can then analyze (e.g., via genetic sequencing) this aerosol sample to calculate a detected amount (or concentration, level) of these tracers, which represents a proportion of the tracer test load detectable (or "visible") to the air sampler within a sampling window. Similarly, during a live period, the air sampler can capture a portion of a total amount of a pathogen present in the space. The remainder of this pathogen not captured by the air sampler can therefore remain in the space, and the ratio of detected pathogen to pathogen remaining in the space (or total pathogen load present in the space prior to aerosol sample capture) during the live period can be similar to the ratio of detected tracers to tracers remaining in the space (or total tracer load present in the space prior to aerosol sample capture) during the calibration period.

The system can therefore derive a calibration factor for the space (and or for particular set of environmental conditions, tracer size, etc.) based on the known concentration of these tracers released by the dispenser and the detected concentration of these tracers in the aerosol sample captured during the calibration period. Further, the system can derive this calibration factor (e.g., for a particular space) over multiple sampling windows during the calibration period. The system can therefore compile results obtained across multiple sampling periods to converge on a particular calibration factor or set of calibration factors (e.g., for a set of tracers) for this space.

11.1 Detectability

During a calibration period, the system can run evaluations to calibrate and confirm functionality of the air sampler. In particular, the system can: trigger the dispenser to intermittently (e.g., at a fixed frequency, pseudo-randomly) release tracer test loads into a space; trigger the air sampler to collect aerosol samples during and/or after release of these tracer test loads in the space; detect tracer levels of various tracers contained in these tracer test loads via genetic sequencing of aerosol samples collected by the air sampler; and compare detected tracer levels with actual or known tracer levels in the tracer test loads to identify a calibration factor for this air sampler.

The system can store information collected for a space during the calibration period in a calibration profile for this space. Later, during a live period succeeding the calibration period, the system can access this calibration profile for the space to: predict pathogen levels within the space; detect changes (e.g., environmental changes) within the space; and provide recommendations to users associated with the space to improve detectability of pathogens in the space.

The system can then leverage this calibration factor to predict actual concentrations of pathogens in this space based on concentrations of these pathogens detected in subsequent aerosol samples collected by this air sampler in this space.

The system can continue to trigger release of tracer test loads by the dispenser after the calibration period to monitor changes in detectability of tracers in the space. In particular, based on a calibration factor derived during the calibration period, the system can estimate an expected concentration in any aerosol sample collected by the air sampler. If, however, the detected tracer concentration is less than this expected concentration, the system can prompt a user associated with the space to investigate the space for possible causes of interference, such as due to changes in airflow, barriers, occupancy, dilution, disinfection, etc. Additionally and/or alternatively, the system can identify a cause of this interference and prompt the user to implement a mitigation action—matched to this cause of interference—to restore detection of tracers and/or pathogens in this space.

11.2 Aerosol Flow Metric: Aerosol Clearance Rate

In one implementation, the system can leverage aerosol data (e.g., collected during a calibration period) to derive an aerosol clearance rate (or rates) in a particular space (e.g., a room) within the facility. In particular, the system can: trigger release of tracer test loads including tracers by the dispenser in the space; simultaneously trigger the air sampler to collect a series of aerosol samples over a particular period of time; and record timeseries amounts of tracers in these aerosol samples. The system can then derive an aerosol clearance rate for tracers in this space based on the timeseries amounts of tracers detected in the space during the particular period of time. Further, the system can derive an aerosol clearance rate for a particular space, for a particular pathogen type (e.g., size), and/or for a particular pathogen.

For example, during the calibration period for a facility, the system can: trigger release of a first tracer test load by a first dispenser installed in a first space within the facility, the first tracer test load including a first test amount of a first tracer; trigger collection of a first aerosol sample by a first air sampler installed in the first space during a first sampling period; trigger collection of a second aerosol sample by the first air sampler during a second sampling period succeeding the first sampling period; and trigger collection of a third aerosol sample by the first air sampler during a third sampling period succeeding the second period. The system can then: access a first detected amount of the first tracer in the first aerosol sample; access a second detected amount of the first tracer in the second aerosol sample; and access a third detected amount of the first tracer in the third aerosol sample.

The system can then: derive a first aerosol clearance rate for a first pathogen type (e.g., pathogens in a particular size range, pathogens of a particular identity)—associated with the first tracer—in this particular space based on reductions to the detected amount of the first tracer over time from the first detected amount during the first sampling period, to the second detected amount during the second sampling period, and to the third detected amount during the third sampling period. The system can repeat this process over multiple calibration and/or sampling periods to converge on an aerosol clearance rate for the first pathogen type in this space.

Further, the system can repeat this process for multiple tracer types in order to derive aerosol clearance rates for multiple pathogen types and/or distinct pathogens in this space. For example, in the preceding example, the system can trigger dispensation of a tracer test load including: the first test amount of the first tracer associated with the first pathogen type; a second test amount of a second tracer associated with a second pathogen type; and a third test amount of a third tracer associated with a third pathogen type. The system can then trigger collection of a series of aerosol samples—including detectable amounts of the first, second, and third tracers—to derive: the first aerosol clearance rate for the first pathogen type; a second aerosol clearance rate for the second pathogen type; and a third aerosol clearance rate for the third pathogen type.

Additionally, the system can repeat this process for different locations of the dispenser and/or air sampler in the space. For example, the system can execute a first calibration period with the dispenser installed in a first location in the space and the air sampler installed in a second location in the space. Then, the system can: prompt a user to manually relocate the dispenser to a third location within the space; and execute a second calibration period with the dispenser installed in the third location in the space and the air sampler installed in the second location. The system can repeat this process over multiple calibration periods.

Additionally and/or alternatively, the system can execute this process for multiple dispensers and/or air samplers located in the space simultaneously. For example, at a first time, the system can: trigger release of a first tracer test load by a first dispenser installed in the first space, the first tracer test load including a first test amount of a first tracer (e.g., linked to the first dispenser); trigger release of a second tracer test load by a second dispenser installed in the first space, the second tracer test load including a second test amount (e.g., equivalent the first test amount) of a second tracer (e.g., linked to the second dispenser); and trigger release of a third tracer test load by a third dispenser installed in the first space, the third tracer test load including a third test amount (e.g., equivalent the first test amount) of a third tracer (e.g., linked to the third dispenser).

11.3 Aerosol Flow Metric: Exposure Reduction Rate

The system can also leverage aerosol data (e.g., collected during a calibration period) to derive an exposure reduction rate (e.g., a rate of exposure reduction over distance) in a particular space (e.g., a room) within the facility.

For example, the system can include: a first dispenser located a first distance from the air sampler and configured to release tracer test loads including a first tracer linked to the first dispenser (e.g., via a first genetic tag associated with the first dispenser); and a second dispenser located a second distance from the air sampler and configured to release tracer test loads including a second tracer linked to the second dispenser (e.g., via a second genetic tag associated with the second dispenser). In this example, the system can: trigger release of a first tracer test load—including a known amount of the first tracer—from the first dispenser; simultaneously trigger release of a second tracer test load—including the known amount of the second tracer—from the second dispenser; and simultaneously trigger collection of a first aerosol sample by the air sampler over a first sampling period of a target duration (e.g., 1 minute, 1 hour, 1 day).

The system can then: access a first detected amount of the first tracer in the first aerosol sample; characterize a first difference between the first detected amount and the known amount of the first tracer; access a second detected amount of the second tracer in the first aerosol sample; characterize a second difference between the second detected amount and the known amount of the second tracer; and derive an exposure reduction rate for the space based on the first distance, the first difference, the second distance, and the second difference.

12. Real-Time Management

The system can enable (near) real-time management of the aerosol zone based on current aerosol flow metrics derived for an aerosol zone, current risk level associated with a set of pathogens in the aerosol zone, and/or current environmental controls within the aerosol zone.

In one implementation, the system can: access a set of threshold risk levels associated with a set of pathogens in a facility; track (e.g., continuously or semi-continuously) a set of risk levels associated with the set of pathogens in a particular aerosol zone in the facility. Then, in response to a first risk level, in the set of risk levels, associated with a first pathogen, in the set of pathogens, exceeding a first threshold risk level, in the set of threshold risk levels, assigned to the first pathogen, the system can: flag the particular aerosol zone as high-risk for the first pathogen; and alert a user associated with the facility. The system can also suggest changes to environmental controls and/or implementation of other interventions (e.g., cleaning protocols) to reduce the first risk level in this aerosol zone.

Alternatively, in another implementation, the system can: suggest a set of target environmental controls for the aerosol zone to a user (e.g., a manager) associated with the aerosol zone, as described above; track a set of current environmental controls in the aerosol zone over time (e.g., continuously, once-per-minute, once-per-hour, once-per-day); compare the set of target environmental controls to the set of current environmental controls (currently) implemented in the aerosol zone; and selectively alert the user of differences between these target environmental controls and the current environmental controls in the aerosol zone.

For example, at a first time, the system can: estimate a set of target environmental controls for an aerosol zone including a maximum occupancy level, a maximum occupancy duration, and a minimum air filtration rate in the aerosol zone (e.g., controlled by an HVAC system installed in the facility); and transmit this set of target environmental controls to an operator associated with the aerosol zone. Then, during a live period succeeding the first time, the system can: track a current occupancy level in the aerosol zone; track a current occupancy duration (e.g., an average occupancy duration, an occupancy duration of each human in user located in the aerosol zone during the live period) in the aerosol zone; and track a current air filtration rate in the aerosol zone. During the live period, in response to detecting the current air filtration rate falling below the minimum air filtration rate, the system can: generate a prompt indicating that the current air filtration rate is below the minimum air filtration rate defined for the aerosol zone; and transmit this prompt to the user. The prompt can also include a suggestion to increase the current air filtration rate—such as to a particular rate exceeding the minimum air filtration rate—in the aerosol zone.

12.1 Dynamic Sampling

In one variation, the system can trigger the air sampler to collect an aerosol sample from a particular space within the facility in response to a current risk level for the space exceeding a threshold risk level defined for this particular space.

For example, the system can: monitor a set of environmental controls (e.g., occupancy, activity level, air filtration rate) in a first aerosol zone, in a set of aerosol zone, in a facility; and track a risk level associated with a first pathogen in the first aerosol zone based on the set of environmental controls and a risk model corresponding to the first aerosol zone. Then, in response to the risk level exceeding a threshold risk level, the system can: flag the first aerosol zone as a high-risk zone for the first pathogen; alert a user associated with the first aerosol zone of the high-risk zone; and trigger collection of an aerosol sample by an air sampler, in a set of air samplers, installed in the first aerosol zone.

The system can therefore selectively trigger collection of aerosol samples in aerosol zones based on interpreted risk associated with pathogens in these aerosol zones.

13. Manager Tool

In one implementation, the system can execute Blocks of the method S100 to assist a manager (or administrator, operator, etc.), associated with a facility, monitor and/or manage risk (e.g., risk of exposure, risk of transmission) associated with a set of pathogens throughout the facility.

In one implementation, the system can prompt a manager, administrator, and/or operator—such as via a native application executing on a computing device associated with the manager—to select a threshold risk level (e.g., between zero percent and 100 percent) for: a facility (e.g., a building); a particular aerosol zone (e.g., a room, a group of rooms) within the facility; and/or a particular pathogen (e.g., Sars-Cov-2, influenza, *E. Coli, salmonella*) in the facility and/or a particular space within the facility. The system can then: characterize risk levels in spaces within the facility over time—such as continuously, at a fixed frequency (e.g., once per minute, once per hour, once per day), and/or selectively based on defined triggers (e.g., environmental triggers) in these spaces—for a set of pathogens specified for these spaces; and alert the manager (e.g., via the native application) when risk level (e.g., in a particular space and/or for a particular pathogen) exceeds the threshold risk level selected by the manager.

For example, the system can host or interface with a manager portal (e.g., via native application or web application) executing on a user's computing device (e.g., a mobile computing device, a desktop computer)—to configure a facility profile for the facility during a setup period. In particular, in this example, the facility profile can include a set of aerosol zone profiles corresponding to a set of aerosol zones in the facility. The system can prompt the manager (e.g., via the manager portal) to select characteristics for each aerosol zone profile, in the set of aerosol zone profiles, such as types of activities assigned to the aerosol zone and/or a group of users associated with the aerosol zone. Additionally, the system can prompt the manager to assign a threshold risk level associated with a pathogen and/or a pathogen type or group of pathogens for a particular aerosol zone and/or for the facility.

Then, at a set frequency—such as once-per-hour, once-per-day, or once-per-week—the system can update each aerosol zone profile, in the set of aerosol zone profiles, to include: a set of (current) risk levels associated with a set of pathogens in the aerosol zone; a set of (current) environmental controls (e.g., current occupancy rate, current air filtration rate) in the aerosol zone; a set of (current) aerosol flow metrics—such as a current air-change rate, an aerosol clearance rate, and/or exposure reduction rate—interpreted from aerosol data collected in the aerosol zone via execution of a tracer test and/or predicted based on the set of environmental controls; a set of (current) pathogen levels in the aerosol zone derived from aerosol samples collected in the aerosol zone; and/or suggestions for reducing risk levels and/or pathogen levels in the aerosol zone. The system can also flag or highlight a particular aerosol zone profile to the manager in response to detecting a risk level in this particular aerosol zone above the threshold risk level assigned by the manager.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a first test period for an aerosol zone:
   during a dispense period, triggering release of a first tracer test load into ambient air in the aerosol zone, according to a first set of release parameters, by a dispenser arranged in a first location within the aerosol zone, the first tracer test load comprising a first concentration of aerosolized tracers of a first type; and
   recording a first timeseries of aerosol data via a first set of sensors integrated into a first air sampler, in a set of air samplers, arranged in a second location within the aerosol zone, the first timeseries of aerosol data representing amounts of aerosolized particles in ambient air ingested by the first air sampler during the first test period;
   deriving a first tracer signal, representing changes in amounts of tracers of the first type in air detected at the first air sampler during the first test period, based on the first timeseries of aerosol data and the first set of release parameters; and
   based on characteristics of the first tracer signal and the first concentration, predicting a first air-change rate, in a set of aerosol flow metrics, for aerosolized particles of the first type in the aerosol zone during the first test period.

2. The method of claim 1, further comprising:
   during a second test period, succeeding the first test period, for the aerosol zone:
   during a second dispense period, triggering release of a second tracer test load into ambient air in the aerosol zone, by the dispenser according to the first set of release parameters, the second tracer test load comprising the first concentration of tracers of the first type; and
   recording a second timeseries of aerosol data via the first set of sensors integrated into the first air sampler, the second timeseries of aerosol data representing amounts of aerosolized particles in ambient air ingested by the first air sampler during the second test period;
   deriving a second tracer signal representing changes in amounts of tracers of the first type in air detected at the first air sampler during the second test period based on the second timeseries of aerosol data and the first set of release parameters;
   based on characteristics of the second tracer signal and the first concentration, predicting a second air-change rate for aerosolized particles of the first type in the aerosol zone during the second test period based on characteristics of the second tracer signal and the first concentration;
   characterizing a first difference between the first air-change rate and the second air-change rate; and
   in response to the first difference exceeding a threshold difference, predicting a first causal pathway for change in air-change rate in the aerosol zone between the first test period and the second test period.

3. The method of claim 2:
   further comprising:
   during the first test period, recording a first timeseries of environmental data via a second set of sensors arranged in the aerosol zone; and
   during the second test period, recording a second timeseries of environmental data via the second set of sensors; and
   wherein predicting the first causal pathway comprises:
   characterizing a second difference between the first timeseries of environmental data and the second timeseries of environmental data; and
   predicting the first causal pathway based on the first difference and the second difference.

4. The method of claim 1, further comprising, in response to the first air-change rate falling below a threshold rate:
   generating a notification indicating the first air-change rate and a prompt to implement a mitigation action, in a set of mitigation actions, configured to increase the first air-change rate in the aerosol zone; and
   transmitting the notification to a user affiliated with the aerosol zone.

5. The method of claim 1:
   further comprising:
   during the first test period, recording a second timeseries of aerosol data via a second set of sensors integrated into a second air sampler, in the set of air samplers, arranged in a third location within the aerosol zone, the second timeseries of aerosol data representing amounts of aerosolized particles in ambient air ingested by the second air sampler during the first test period; and
   deriving a second tracer signal representing changes in amounts of tracers of the first type in air detected at the second air sampler during the first test period based on the second timeseries of aerosol data and the first set of release parameters; and
   wherein predicting the first air-change rate for aerosolized particles of the first type in the aerosol zone during the first test period based on characteristics of the first tracer signal and the first concentration comprises predicting the first air-change rate for aerosolized particles of the first type in the aerosol zone during the first test period based on characteristics of the first tracer signal, characteristics of the second tracer signal, and the first concentration.

6. The method of claim 1:
   wherein triggering release of the first tracer test load into ambient air in the aerosol zone comprises triggering release of the first tracer test load into ambient air in the aerosol zone, the first tracer test load comprising:
   the first concentration of aerosolized tracers of the first type; and
   a second concentration of aerosolized tracers of a second type;
   wherein recording the first timeseries of aerosol data comprises recording the first timeseries of aerosol data comprising:
   a first timeseries of particle amounts representing amounts of aerosols of the first type detected at the air sampler during the first test period; and
   a second timeseries of particle amounts representing amounts of aerosols of the second type detected at the air sampler during the first test period;

wherein deriving the first tracer signal based on the first timeseries of aerosol data and the first set of release parameters comprises deriving the first tracer signal based on the first timeseries of particle amounts and the first set of release parameters; and further comprising:
  deriving a second tracer signal representing changes in amounts of tracers of the second type in air detected at the first air sampler during the first test period based on the second timeseries of particle amounts and the first set of release parameters; and
  based on characteristics of the second tracer signal and the second concentration, predicting a second air-change rate for aerosolized particles of the second type in the aerosol zone during the first test period based on characteristics of the second tracer signal and the second concentration.

7. The method of claim 1, further comprising:
  accessing set of zone parameters defined for the aerosol zone;
  accessing a risk model linking air-change rates for aerosolized particles of the first type to risk associated with pathogens of the first type in aerosol zones based on zone parameters in the aerosol zone; and
  predicting a first risk level for the aerosol zone during the first test period based on the set of zone parameters, the first air-change rate, and the set of zone parameters.

8. The method of claim 7, further comprising, in response to the first risk level exceeding a threshold risk:
  generating a notification indicating the first risk level for the first pathogen in the aerosol zone; and
  transmitting the notification to a user affiliated with the aerosol zone.

9. The method of claim 1:
  wherein triggering release of the first tracer test load into ambient air in the aerosol zone according to the first set of release parameters comprises triggering release of the first tracer test load into ambient air in the aerosol zone according to the first set of release parameters comprising:
    an initial dispense time corresponding to a start of the dispense period;
    a duration of the dispense period; and
    a dispensation rate representing a rate of release of aerosolized tracers from the dispenser during the first test period; and
  wherein deriving the first tracer signal comprises:
    calculating a target sampling window based on the first set of release parameters, the target sampling window defining an initial sampling time and a final sampling time;
    extracting a second timeseries of aerosol data from the first timeseries of aerosol data, the second timeseries of aerosol data collected during the target sampling window; and
    deriving the first tracer signal, representing changes in amounts of tracers of the first type in air detected at the first air sampler during the sampling window between the initial sampling time and the final sampling time, based on the second timeseries of aerosol data.

10. The method of claim 1:
  wherein deriving the first tracer signal based on the first timeseries of aerosol data and the first set of release parameters comprises:
    accessing a signal-processing model configured to intake timeseries of aerosol data and output tracer signals based on release parameters;
    based on the signal-processing model, the first timeseries of aerosol data, and the first set of release parameters, identifying a sampling window, within the first test period, predicted to correspond to the first tracer signal;
    accessing a second timeseries of aerosol data, in the first timeseries of aerosol data, corresponding to aerosol data recording during the sampling window; and
    deriving the first tracer signal based on the second timeseries of aerosol data and the signal-processing model; and
  wherein predicting the first air-change rate based on characteristics of the first tracer signal and the first concentration comprises:
    extracting a first amount of tracers of the first type detected in air at an initial time within the sampling window;
    extracting a second amount of tracers of the first type detected in air at a final time within the sampling window;
    predicting a decay rate in amount of tracers of the first type within the sampling window; and
    predicting the first air-change rate based on the first concentration, the first amount, the second amount, and the decay rate.

11. A method comprising:
  during a test period:
    during a dispense period, triggering release of a first tracer test load into ambient air in an environment, according to a first set of release parameters, by a dispenser arranged within the environment, the first tracer test load comprising a first concentration of tracers of a first type; and
    triggering a first air sampler, in a set of air samplers, located in the environment, to record a timeseries of aerosol data via a set of sensors integrated into the air sampler; and
  in response to expiration of the test period:
    deriving a tracer signal, in a set of tracer signals, representing changes in amounts of tracers in air detected at the air sampler during the test period based on the timeseries of aerosol data recorded at the air sampler and the first set of release parameters;
    based on characteristics of the set of tracer signals, characterizing a set of aerosol flow metrics, including air-change rate, representing behavior of aerosols in the environment during the test period;
    characterizing infection risk, associated with a set of pathogens, for the environment during the test period based on the set of aerosol flow metrics and a set of zone characteristics defined for the environment; and
    in response to infection risk associated with a first pathogen, in the set of pathogens, exceeding a threshold infection risk:
      generating a notification indicating risk associated with the first pathogen in the environment; and
      transmitting the notification to a user affiliated with the environment.

12. The method of claim 11, wherein characterizing infection risk based on the set of aerosol flow metrics and the set of zone characteristics defined for the environment comprises:

accessing the set of zone characteristics defined for the environment;

accessing a risk model linking aerosol flow metrics derived for the environment and infection risk associated with the set of pathogens based on the set of zone characteristics defined for the environment; and characterizing infection risk in the environment during the test period based on the set of aerosol flow metrics, the set of zone characteristics, and the risk model.

13. The method of claim 11, further comprising, during a first time period comprising the test period:

accessing a first set of environmental data recorded during the test period by a second set of sensors arranged in the environment;

during a second test period succeeding the test period:
triggering release of a second tracer test load into ambient air in the environment, according to a second set of release parameters, by the dispenser arranged within the environment, the second tracer test load comprising a second concentration of tracers of the first type; and triggering the first air sampler to record a second timeseries of aerosol data via the set of sensors;

deriving a second tracer signal, in a second set of tracer signals, representing changes in amounts of tracers in air detected at the first air sampler during the second test period based on the second timeseries of aerosol data and the second set of release parameters;

based on characteristics of the set of tracer signals, characterizing a second set of aerosol flow metrics representing behavior of aerosols in the environment during the second test period;

accessing a second set of environmental data recorded by the second set of sensors during the second test period;

deriving a flow model linking environmental controls to aerosol flow metrics in the environment based on the first set of environmental data, the first set of aerosol flow metrics, the second set of environmental data, and the second set of aerosol flow metrics; and during a second time period succeeding the first time period:

accessing a third set of environmental data recorded by the second set of sensors at a second time during the live period; and predicting a second set of aerosol flow metrics for the environment at the second time based on the third set of environmental data and the flow model.

14. The method of claim 11, further comprising, during the test period:

triggering a second air sampler, in the set of air samplers, located in the environment, to record a second timeseries of aerosol data via a second set of sensors integrated into the air sampler;

in response to expiration of the test period, deriving a second tracer signal, in the set of tracer signals, representing changes in amounts of tracers in air detected at the second air sampler during the test period based on the second timeseries of aerosol data recorded at the air sampler and the first set of release parameters; and wherein characterizing the set of aerosol flow metrics comprises characterizing the set of aerosol flow metrics based on the first tracer signal and the second tracer signal, the set of aerosol flow metrics comprising:

a set of flow pathways for aerosol of the first type in the aerosol zone.

15. The method of claim 11:

wherein characterizing infection risk associated with the set of pathogens based on the set of aerosol flow metrics comprises characterizing infection risk associated with the set of pathogens based on the air-change rate.

16. The method of claim 11:

further comprising:

triggering a second air sampler to record a second timeseries of aerosol data via a second set of sensors integrated into the second air sampler; and deriving a second tracer signal, in the set of tracer signals, representing changes in amounts of tracers in air detected at the second air sampler during the test period based on the second timeseries of aerosol data and the first set of release parameters; and wherein characterizing the set of aerosol flow metrics based on characteristics of the set of tracer signals comprises characterizing the set of aerosol flow metrics based on the first tracer signal and the second tracer signal.

* * * * *